United States Patent
Colonna et al.

(10) Patent No.: US 12,389,201 B2
(45) Date of Patent: Aug. 12, 2025

(54) METHOD AND SYSTEM FOR ESTIMATING THE PRESENCE OF PEOPLE ON A TERRITORY EXPLOITING MOBILE COMMUNICATION NETWORK DATA

(71) Applicant: TELECOM ITALIA S.p.A., Milan (IT)

(72) Inventors: Massimo Colonna, Turin (IT); Piero Lovisolo, Turin (IT); Dario Parata, Turin (IT); Massimiliano Petra, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 387 days.

(21) Appl. No.: 17/999,692

(22) PCT Filed: May 18, 2021

(86) PCT No.: PCT/EP2021/063168
§ 371 (c)(1),
(2) Date: Nov. 22, 2022

(87) PCT Pub. No.: WO2021/239520
PCT Pub. Date: Dec. 2, 2021

(65) Prior Publication Data
US 2023/0319508 A1    Oct. 5, 2023

(30) Foreign Application Priority Data

May 28, 2020 (IT) .................. 102020000012739

(51) Int. Cl.
*H04W 4/029* (2018.01)
*H04W 4/021* (2018.01)

(52) U.S. Cl.
CPC ........... *H04W 4/029* (2018.02); *H04W 4/021* (2013.01)

(58) Field of Classification Search
CPC ..... H04W 4/029; H04W 4/021; H04W 4/027; H04W 4/02; H04W 4/023; H04W 64/00;
(Continued)

(56) References Cited

U.S. PATENT DOCUMENTS

| | | | |
|---|---|---|---|
| 2006/0293046 A1 | 12/2006 | Smith | |
| 2012/0115475 A1* | 5/2012 | Miyake | H04W 4/021 455/435.1 |
| 2012/0115476 A1 | 5/2012 | Shin et al. | |
| 2013/0179058 A1 | 7/2013 | Smith | |

OTHER PUBLICATIONS

International Search Report & Written Opinion issued Aug. 18, 2021 in PCT/EP2021/063168 filed on May 18, 2021, 16 pages.
Calabrese et al. "Real-Time Urban Monitoring Using Cell Phones: A Case Study in Rome", IEEE Transactions on Intelligent Transportation Systems, vol. 12, No. 1, Mar. 2011. pp. 141-151.
(Continued)

*Primary Examiner* — Alison Slater
*Assistant Examiner* — Jing Gao
(74) *Attorney, Agent, or Firm* — Oblon, McClelland, Maier & Neustadt, L.L.P.

(57) ABSTRACT

A method including subdividing a geographic area of interest in geographic zones; subdividing the geographic area of interest in geographic area portions; causing mobile communication terminals situated in the geographic area of interest to calculate respective geographic position estimates; distributing an overall number of geographic position estimates; receiving indications of events of interaction between the mobile communication terminals and network cells; identifying, for each one of the stored indications of events of interaction, the network cell in which the event of interaction occurred; building an array of presences in which each geographic zone has assigned thereto a respective indication of a respective number of events of interaction occurred in the identified network cells which have, in the geographic zone, a cell weight greater than a predetermined cell weight value, and providing the array of presences in output for estimating presence of individuals on a territory.

10 Claims, 13 Drawing Sheets

(58) Field of Classification Search
CPC ......... H04W 4/90; H04W 4/025; H04W 4/44;
H04W 64/003; H04W 4/50; H04W 12/63;
H04W 88/02; H04W 8/005; H04W 4/46;
H04W 24/08; H04W 48/16; H04W 48/04;
H04W 4/48; H04W 12/64; H04W 8/18;
H04W 4/60; H04W 8/08; H04W 16/18;
H04W 92/18; H04W 36/322; H04W
52/0229; H04W 40/20; H04W 8/02;
H04W 72/54; H04W 40/18; H04W 36/32;
H04W 52/245; H04W 36/36; H04W
52/343; H04L 67/52; H04L 67/535; H04L
2101/69; H04L 63/1425; H04L 43/0876;
H04L 47/125; H04M 1/72457; H04M
2250/10; H04M 2242/30; H04M 3/42348;
H04M 2203/2094; G06F 16/29; G06F
2221/2111; G01S 19/42

See application file for complete search history.

(56) References Cited

OTHER PUBLICATIONS

Francesco Calabrese and Carlo Ratti, "Real Time Rome", Networks and Communications Studies, vol. 20, n° 3-4, pp. 247-258, 2006.

Caceres et al. "Exploring the Use of Urban Greenspace through Cellular Network Activity", 2nd Workshop on Pervasive Urban Applications (PURBA), Jun. 2012.

Deville et al. "Dynamic population mapping using mobile phone data", PNAS Nov. 11, 2014, 111 (45) 15888-15893; first published Oct. 27, 2014, available at https://doi.org/10.1073/pnas.1408439111.

Danya Bachir, "Estimating Urban Mobility with Mobile Network Geolocation Data Mining", Université Paris Saclay; https://theses.hal.science/tel-02046122v1, Feb. 22, 2019.

* cited by examiner

| UE_id | position (x, y) | timestamp |
|---|---|---|
| $UE\_Id_1$ | $pos_1$ | $ts_1$ |

FIG.7

METHOD AND SYSTEM FOR ESTIMATING THE PRESENCE OF PEOPLE ON A TERRITORY EXPLOITING MOBILE COMMUNICATION NETWORK DATA

BACKGROUND OF THE PRESENT DISCLOSURE

Field of the Present Disclosure

The present disclosure generally relates to the field of mobile communications and mobile communication networks. More specifically, the present disclosure relates to a method and a system for exploiting data of a mobile communication network for estimating presences of individuals on a territory.

Overview of the Related Art

Mobile phones (also referred to as cell phones, hand phones, mobile terminals, mobile stations, user equipment, and, for the purposes of the present disclosure, intended to include smartphones and tablets and, more generally, mobile communication devices with 2G-3G-4G-5G connectivity) have become an essential part of the everyday life of many people. Due to this, it has been realized that mobile phones can expediently be used as sensors for monitoring the behaviour of communities of persons in several fields of application.

WO 2013/107669 A1 discloses a method to automatically detect and label one or more points of interest (PoIs) of a user of mobile phone services, said method being based exclusively on geo-located phone usage information and with no customer interaction. Based on the geo-located usage events generated in the telecommunications operator network and using statistical methods, the method allows the identification of, from all the locations visited by the user, the locations that are most relevant to him: his PoIs. The method automatically assigns labels to the PoIs detected, thereby attaching meaning to such locations.

US 2006/0293046 proposes a method for exploiting data from a wireless telephony network to support traffic analysis. Data related to wireless network users are extracted from the wireless network to determine the location of a mobile station. Additional location records for the mobile station can be used to characterize the movement of the mobile station: its speed, its route, its points of origin and destination, and its primary and secondary transportation analysis zones. Aggregating data (http://en.wikipedia.org/wiki/Voronoi_diagram). Such a Voronoi tessellation is achieved starting from the locations of the radio base stations of the mobile communication network and taking into account the directionality of the antennas installed on the radio base stations. To each tile of the tessellation a network cell is univocally associated and, consequently, each tile is assigned the whole value of the data available at the cell level. Thus, a uniform distribution of the data available at the cell level onto the corresponding tile is achieved.

The following works provide a step forward in the calculation of the presence of individuals on an arbitrary partition in zones of a geographic area, instead that on pixels or on areas linked to the mobile communication networks.

In Pierre Deville, Catherine Linard, Samuel Martin, Marius Gilbert, Forrest R. Stevens, Andrea E. Gaughan, Vincent D. Blondel, and Andrew J. Tatem, "Dynamic population mapping using mobile phone data", PNAS Nov. 11, 2014 111 (45) 15888-15893; first published Oct. 27, 2014, available at https://doi.org/10.1073/pnas. 1408439111, it is shown how spatially and temporarily explicit estimations of population densities can be produced at national scales, and how these estimates compare with outputs produced using alternative human population mapping methods. It is also demonstrated how maps of human population changes can be produced over multiple timescales while preserving the anonymity of MP users. The total number of users of the j-th cell, $T_j$, is distributed onto any i-th area $a_i$ by:

1) considering the Voronoi polygon $v_j$ corresponding to the j-th cell (calculated in standard way as described in http://en.wikipedia.org/wiki/Voronoi_diagram);
2) distributing the data $T_j$ uniformly over the polygon $v_j$;
3) detecting the intersection between the polygon and the area $a_i$, and then
4) uniformly distributing the users on such intersection.

Consequently, the wider the intersection the greater the quota of the data $T_j$ distributed on the area $a_i$.

In Danya Bachir, "Estimating Urban Mobility with Mobile Network Geolocation Data Mining", Thèse de doctorat de l'Université Paris-Saclay préparée à IRT SystemX, Bouygues Telecom, Télécom SudParis, Ecole doctorale n°1 Sciences et technologies de l'information et de la communication (STIC); Spécialité de doctorat: Réseaux, information et communications; thesis presented and discussed at Gif-sur-Yvette on 25 Jan. 2019, urban mobility is estimated by mining mobile network data, which are collected in real-time by mobile phone providers at no extra-cost. Processing the raw data is reported to be non-trivial as one must deal with temporal sparsity, coarse spatial precision and complex spatial noise. The thesis work addresses two problematics through a weakly supervised learning scheme (i.e., using few labelled data) combining several mobility data sources. First, population densities and number of visitors over time are estimated, at fine spatio-temporal resolutions. Second, Origin-Destination matrices are derived representing total travel flows over time, per transport modes. All estimates are exhaustively validated against external mobility data, with high correlations and small errors. The distribution of the total number of users $T_j$ of the j-th cell ("total number of different users $T_j$") is distributed on any i-th area $a_i$ taking into account two factors: on one side, as in the preceding work, there is an intersection between the Voronoi polygon of the j-th cell and the area $a_i$, on the other side there is the "census population" in the area $a_i$: the greater the population density, the greater the quota of $T_j$ that is assigned to the area $a_i$ (in the calculation, use is made of the population density assuming a uniform distribution on the area).

SUMMARY OF THE PRESENT DISCLOSURE

The Applicant has observed that the known methods for estimating presence of individuals on a territory are not satisfactory.

In all the works discussed in the technical literature outlined in the foregoing, methods for calculating the presence of individuals on a territory are proposed that start from data extracted from the mobile communication network, and that, through simple and easy to implement software methods, distribute the aggregated data at the network cell level on the territory. However, at the same time, such methods are based on a hypothesis of uniform/exponential distribution of population that is unrealistic: in everyday life the users of the mobile communication network are not uniformly/exponentially distributed on the territory with respect to network cells or radio sites. This causes gross errors when one is interested in knowing the presence of individuals at a local level, at a scale (much) smaller than that of the network cell size, as requested by the practical applications mentioned before.

The Applicant has observed that in several activities of planning and managing of services offered to the population, particularly activities of management of emergencies and security services, as well as activities of marketing and promotion (e.g., poster advertising), and for monitoring events and estimating the number of attendees, it is important to accurately calculate the presence of individuals on the territory at any given time, on any possible geographic area of interest.

Contrary to this, as mentioned a few lines above, works available in the technical literature disclose methods that are unrealistic and source of gross errors.

The Applicant believes that there is the need of overcoming these problems by defining a new method for calculating the presence of people on the territory, that reflects the actual positioning of individuals and that can be used for estimating the presence of people at a scale even much smaller than the typical size of mobile communication network cells.

The Applicant has found that this goal can be achieved starting from a certain number of estimates of position that a (properly selected) set of mobile terminals perform and send to a central system (apparatus or server). These position estimates, properly processed, allow calculating weights to be assigned to cells of the mobile communication network on zones of a subdivision in zones of an area of interest. Such weights are indications of the probabilities that an individual which is a user of a mobile terminal located in an area covered by each network cell is also located in a specific zone among the zones in which the area of interest is subdivided.

Through such weights, data available at and provided by the mobile communication network is distributed through the zones to obtain a count of the presence of individuals on each zone of the area of interest in a certain time interval.

The position estimates performed and provided by the mobile communication terminals can be obtained preliminarily to the count of the presence of individuals and can be re-used more times in the count of the presence of individuals for an area of interest thereby achieving an efficient use of mobile communication network resources and a reduction of computational burden.

By "data available at the mobile communication network" it is meant data indicating events of interaction between mobile phones of users located in the area of interest and the cells of the mobile communication network. Events of interaction useful for the purposes of the present disclosure include for example one or more among (the following list is not exhaustive and not limitative, and may for example change with the evolution of the mobile communications technologies):

interactions at the power-on and/or power-off of the mobile phones;

interactions at location area update (either periodical, performed with a periodicity imposed by the mobile communication network, or non-periodical, carried out when a mobile communication device informs the cellular network whenever it moves from one "Location Area" to the next; as known, a "Location Area" is a portion of a territory formed by a group of network cells);

interactions at the re-entrance of the mobile phone into a covered area, covered by the mobile communication network, from an area not covered by the network;

interactions at the switch of the mobile phone from a mobile network technology to another (e.g., from 2G to 3G or viceversa, etc.);

interactions at incoming/outgoing calls (namely, at placing an outgoing call, at answering an incoming call);

interactions at sending/receiving SMS and/or MMS;

interactions at Internet access (from a browser or any other app of the mobile phone).

According to an aspect of the present disclosure, there is provided a method, implemented by a data processing system, for estimating presence of individuals on a territory based on data derived from a mobile communication network comprising a plurality of network cells covering said territory, wherein said individuals are users of mobile communication terminals configured to be adapted to interact with the mobile communication network and located in said territory.

The method comprises:

subdividing a geographic area of interest in geographic zones;

subdividing the geographic area of interest in geographic area portions;

causing mobile communication terminals served by the mobile communication network and situated in the geographic area of interest to calculate respective geographic position estimates and provide the calculated geographic position estimates to the data processing system;

distributing an overall number of geographic position estimates, received from the mobile communication terminals, on the geographic area portions by assigning to each geographic area portion a respective number of geographic position estimates corresponding to geographic positions estimates falling within said geographic area portion;

for each of said at least one network cell:
    determining, among said geographic area portions, covered geographic area portions falling within a coverage area of said network cell;

assigning to each one of the determined covered geographic area portions a respective weight which depends on said respective number of geographic position estimates compared to an overall number of geographic position estimates falling within all said determined covered geographic area portions;

generating a correspondence map establishing a correspondence between said network cells and said geographic zones, said generating the correspondence map comprising, for each of said network cells, calculating a cell weight of the network cell on each geographic zone by determining the geographic area portions belonging to each of said zones and summing the respective weights of the geographic area portions identified as belonging to said each of said zones;

receiving from the mobile communication network and storing in a repository indications of events of interaction between the mobile communication terminals and the network cells of the mobile communication network;

identifying, for each one of the stored indications of events of interaction, the network cell in which the event of interaction occurred;

using the correspondence map, building an array of presences in which each of said geographic zones has assigned thereto a respective indication of a respective number of events of interaction occurred in the identified network cells which have, in said each of said geographic zones, a cell weight greater than a predetermined cell weight value, and providing said array of presences in output to said data processing system for the use, by a user of the data processing system, for estimating presence of individuals on a territory.

In embodiments, the events of interaction may comprise at least one among:
- interactions at the power-on and/or power-off of the mobile communication terminals;
- interactions at location area update procedures;
- interactions at the re-entrance of the mobile communication terminals into a covered area, covered by the mobile communication network, from an area not covered by the network;
- interactions at the switch of the mobile communication terminals from a mobile network technology to another;
- interactions at incoming/outgoing calls;
- interactions at sending/receiving SMS and/or MMS;
- interactions at Internet access.

In embodiments, the building an array of presences may comprise building a set of arrays of presences, each array of presences of said set being related to a respective time slot of a plurality of time slots in which an observation time period is subdivided.

In embodiments, the causing mobile communication terminals served by the mobile communication network and situated in the geographic area of interest to calculate respective geographic position estimates and provide the calculated geographic position estimates to the data processing system may comprise selecting, among all the mobile communication terminals served by the mobile communication network and situated in the geographic area of interest, a subset of selected mobile communication terminals according to a selection criterion comprising at least one among:
- mobile communication terminals of users which have given their consent to activate their geographic localization;
- mobile communication terminals of users which have given their consent to take part to measurement campaigns to be performed for purpose of calculating presence of individuals on a geographic territory;
- mobile communication terminals of users which, at subscription, have declared a residence in a certain area inside the geographic area of interest;
- mobile communication terminals of users in respect of which the operator of the mobile communication network has determined a residence or a working location in a certain area inside the geographic area of interest.

In embodiments, the method may comprise configuring the subset of selected mobile communication terminals, said configuring comprising providing to the selected mobile communication terminals at least one among:
- an indication of a time interval during which the selected mobile communication terminals will have to calculate the respective geographic position estimates;
- an indication of a periodicity with which the selected mobile communication terminals will have to calculate the respective geographic position estimates;
- an indication of whether the selected mobile communication terminals will have to provide to the data processing system the respective calculated geographic position estimates immediately after the respective geographic position estimates have been calculated or the respective calculated geographic position estimates can be provided to the data processing system at a later time after they have been calculated.

In embodiments, the determining covered geographic area portions falling within a coverage area of that network cell may comprise:
- obtaining a coverage area of that network cell;
- determining which of said geographic area portions belong to the coverage area of the network cell, wherein said determining comprises at least one among:
- assessing which of said geographic area portions have geographic coordinates of a center of gravity thereof falling inside the coverage area of the network cell;
- assessing which of said geographic area portions fall, for a given percentage of their area, inside the coverage area of the network cell.

In embodiments, the determining the geographic area portions belonging to each of said zones may comprise one among:
- assessing which of said geographic area portions have geographic coordinates of a center of gravity thereof falling inside the zone;
- assessing which of said geographic area portions fall, for a given percentage of their area, inside the zone.

In embodiments, the assigning to each geographic area portion a respective number of geographic position estimates corresponding to geographic positions estimates falling within said geographic area portion may comprise, in case a geographic position estimate falls on a boundary between at least two geographic area portions:
- either randomly selecting one of the at least two geographic area portions to be assigned to that geographic position estimate,
- or assigning to each of said at least two geographic area portions a fraction of said geographic position estimate equal to 1 divided by the number of said at least two geographic area portions.

In embodiments, the calculated geographic position estimates may be provided in the form of t-uples, wherein each t-uple may comprise: a field containing an indication of the geographic position estimated by the mobile communication terminal, expressed in any system of geographic coordinates, a field containing an indication of the time instant at which the geographic position estimate has been calculated, optionally a field containing an indication of a univocal identifier of the mobile communication terminal that calculated and sent the geographic position estimate.

According to another aspect of the present disclosure, a data processing system is provided comprising modules configured to perform, when operated, the method of the previous aspect.

Thanks to the solution according to the present disclosure, the presence of people on the territory can be calculated in a way that reflects the actual positioning of individuals, even at a scale much smaller than the typical size of mobile communication network cells.

BRIEF DESCRIPTION OF THE ANNEXED DRAWINGS

These and other features and advantages of the solution according to the present disclosure will be better understood by reading the following detailed description of embodiments thereof, provided merely by way of non-limitative examples, to be read in conjunction with the attached drawings, wherein:

FIG. 1 schematically depicts a system according to an embodiment of the present disclosure for calculating presence of individuals on a geographic territory;

FIG. 2 schematically depicts a component (referred to as Localization Manager) of the system of FIG. 1;

FIG. 3 schematically depicts a surveyed geographic area, hereafter also referred to as "Region of Interest" ("RoI" in short), and a subdivision thereof in zones;

Figure 1:
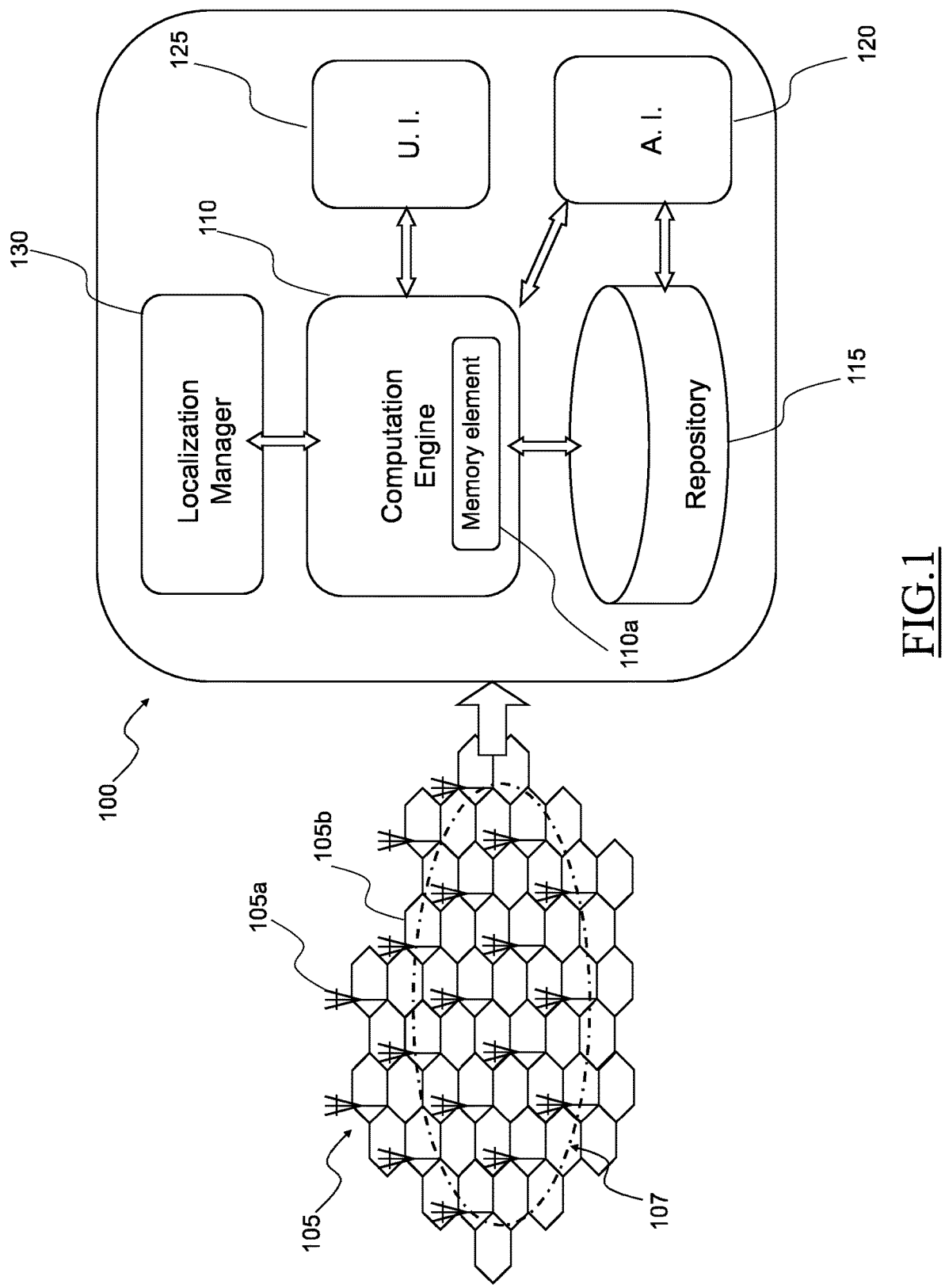
Figure 6:
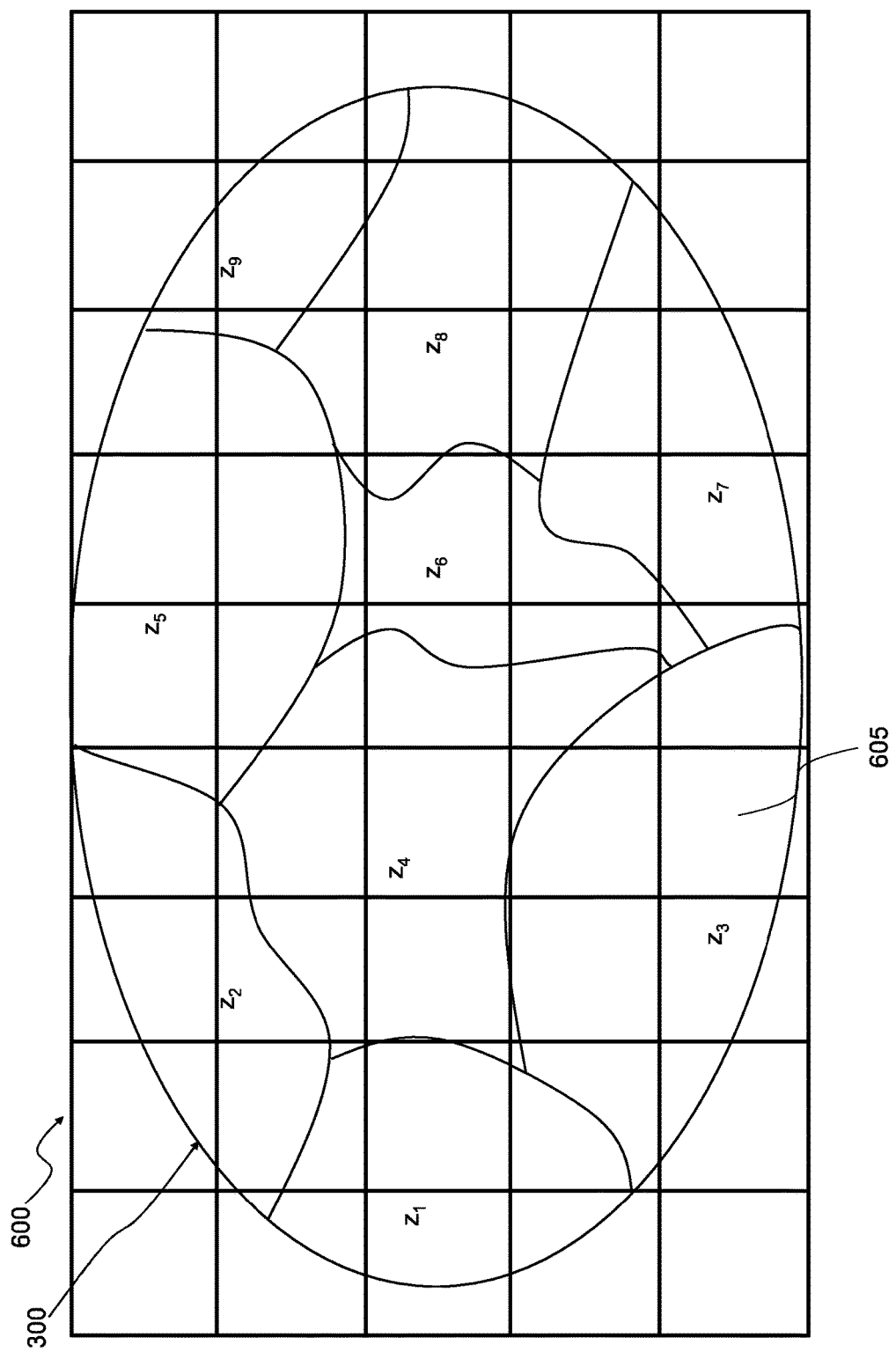
Figure 8:
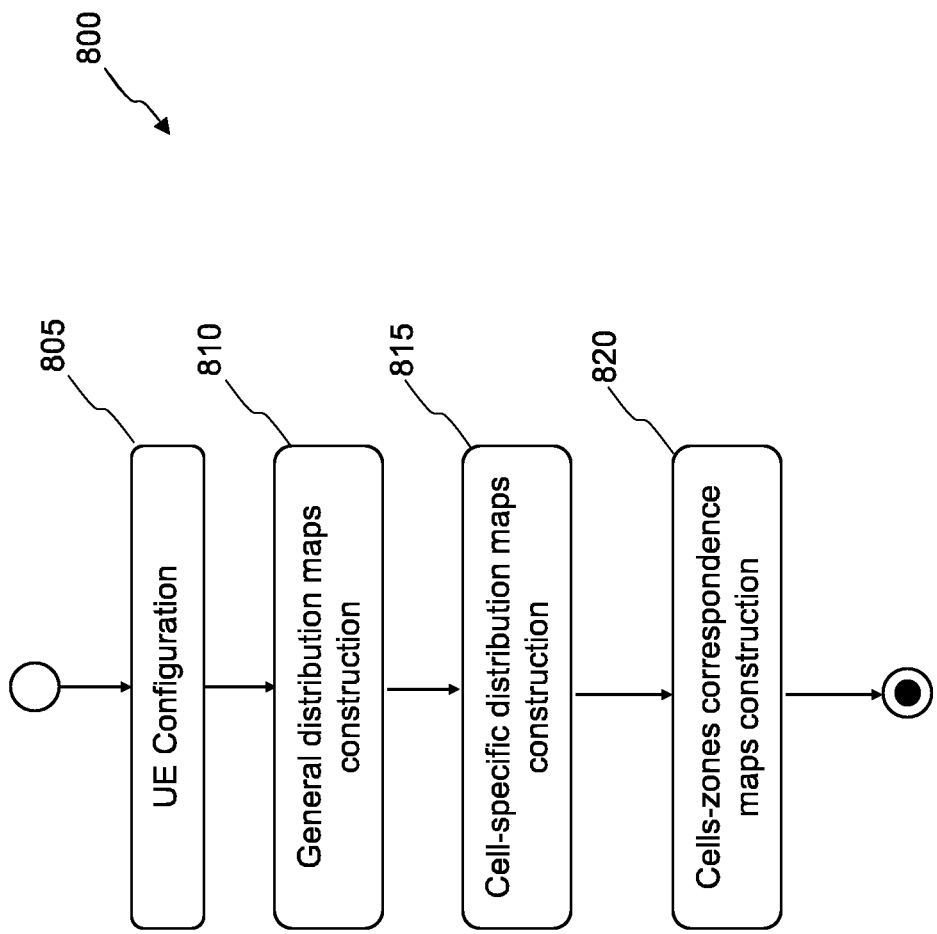
Figure 9:
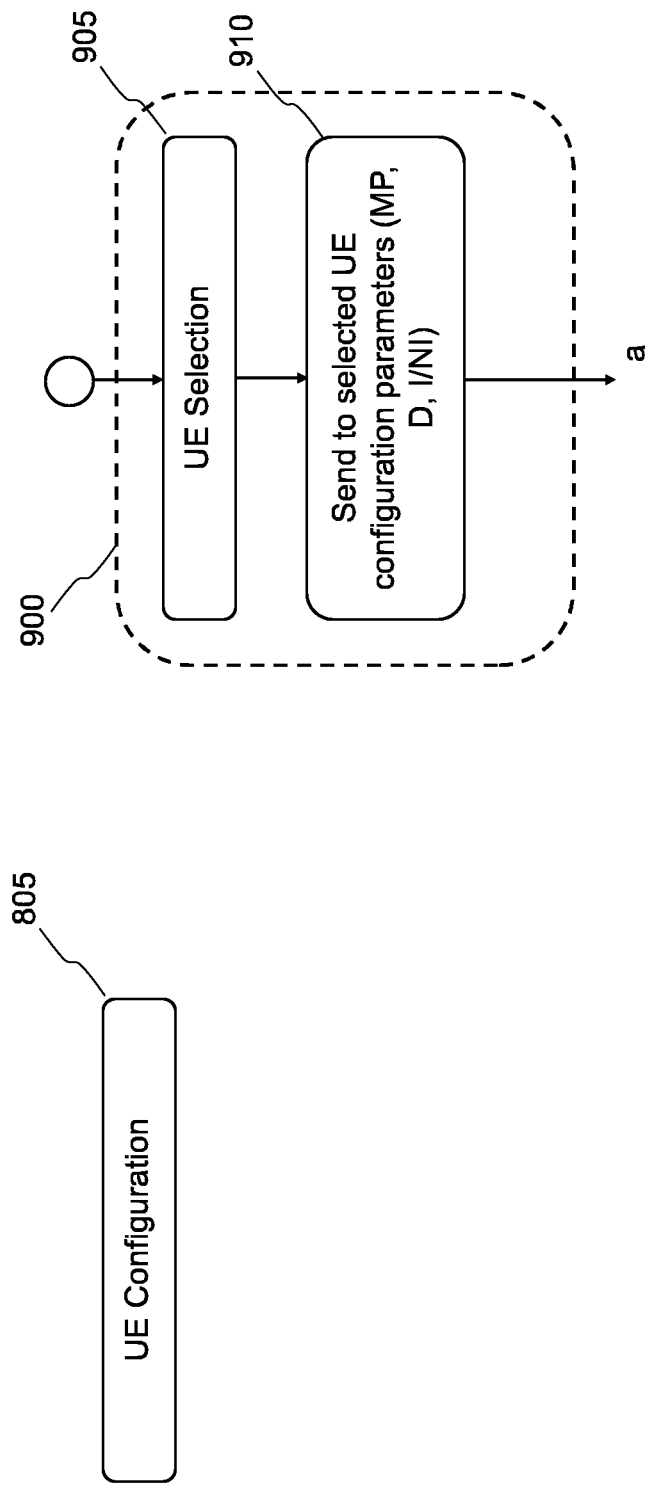
Figure 10:
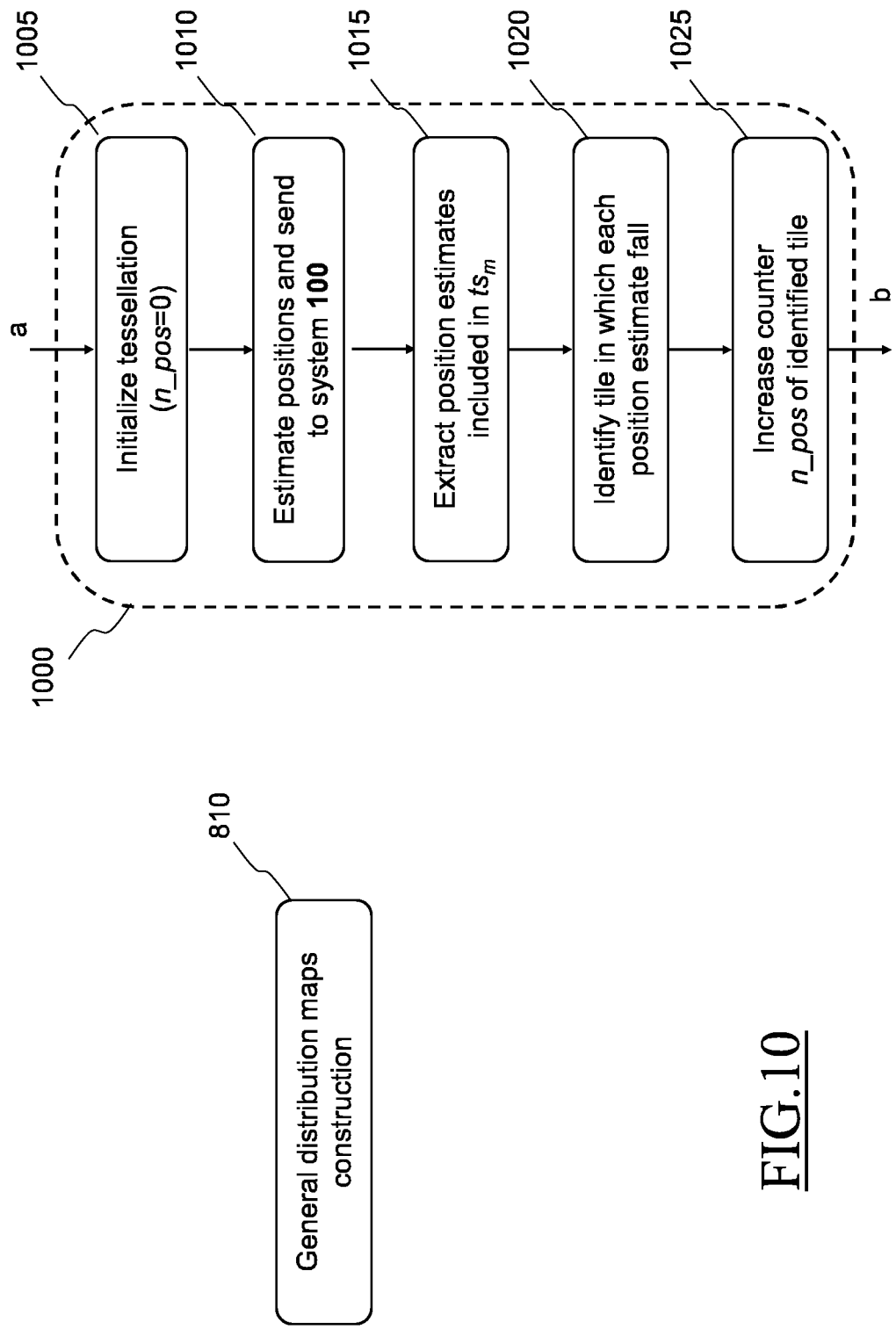
Figure 11:
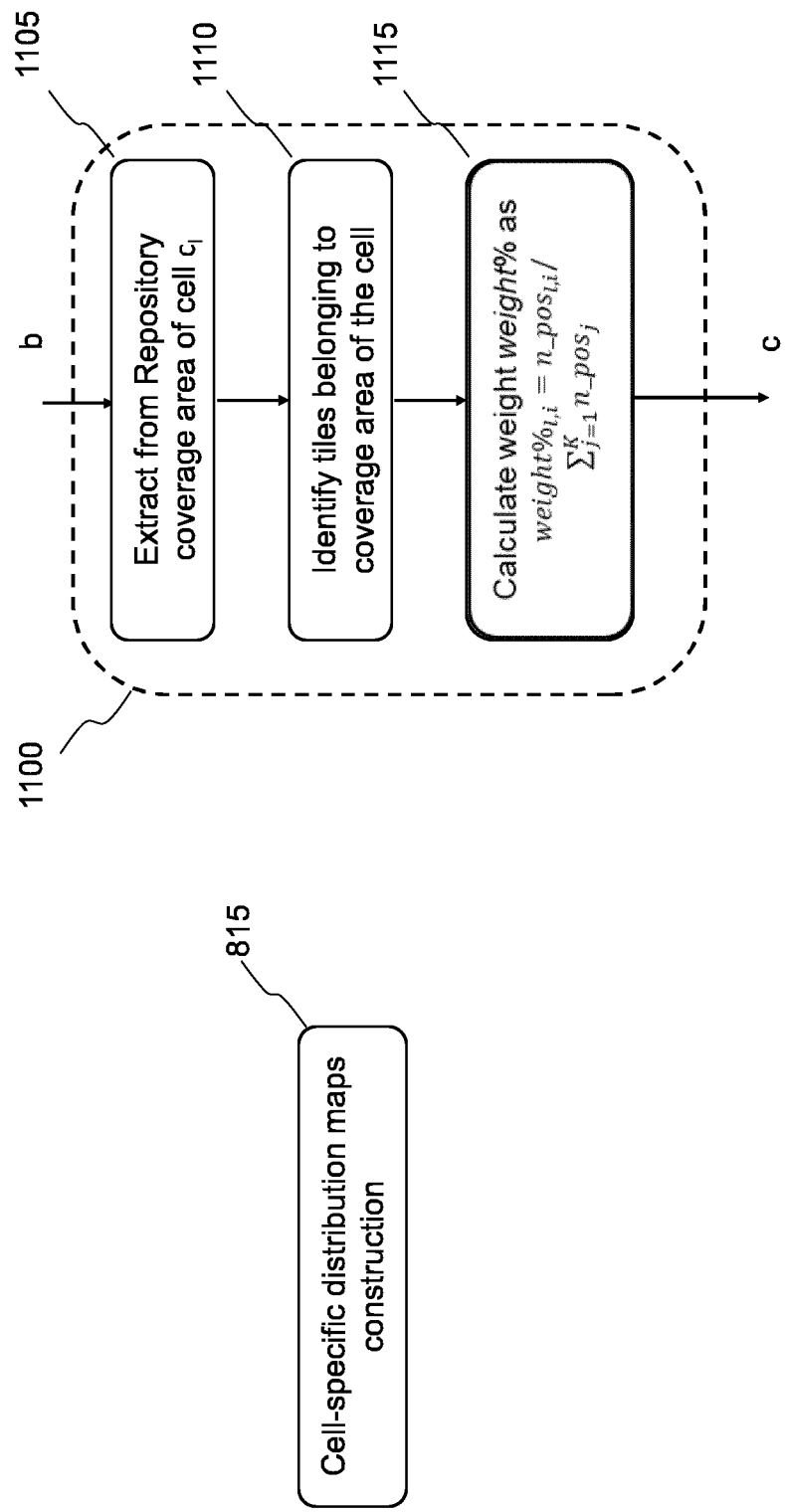
Figure 12:
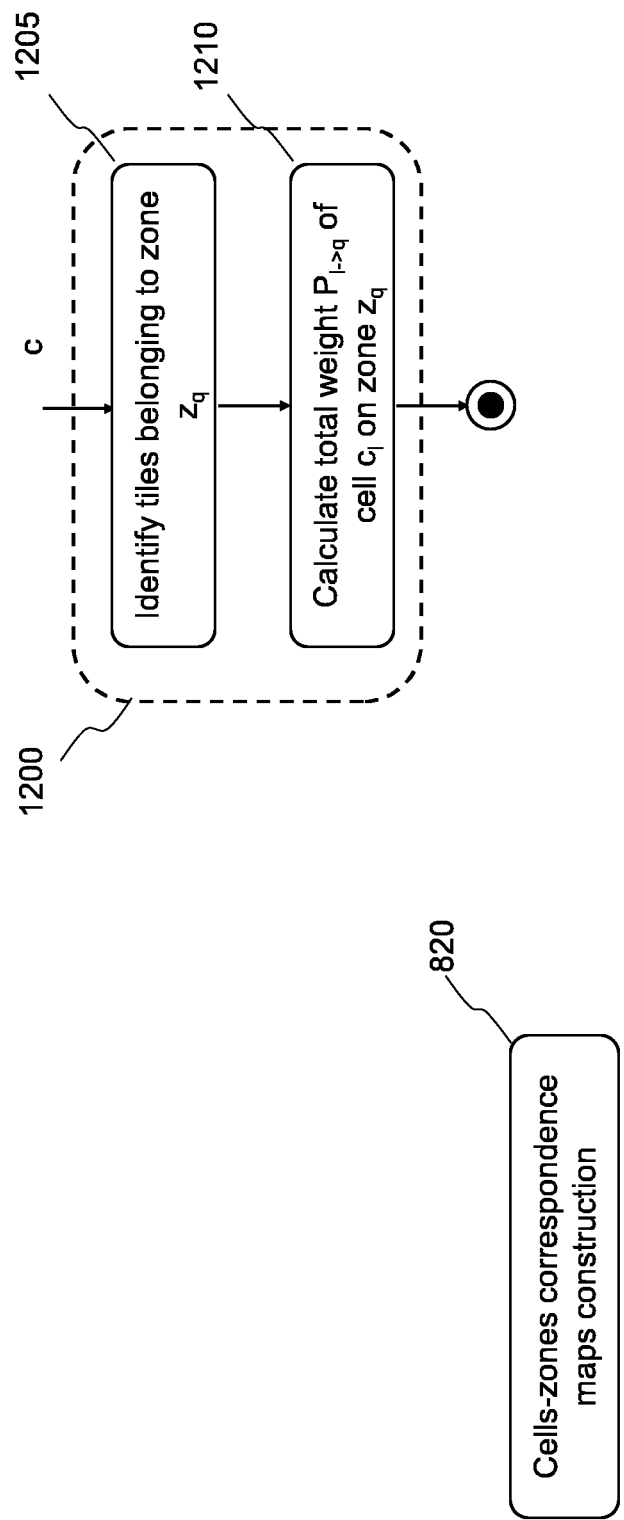
Figure 13:
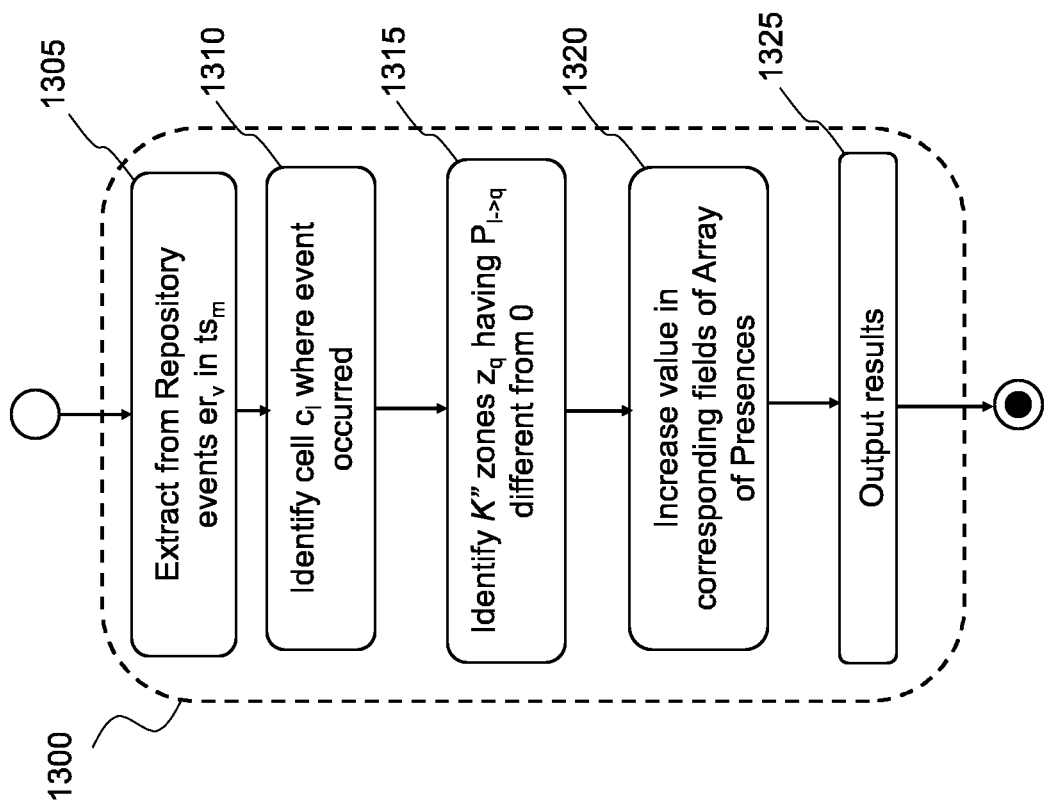

FIG. 6 schematically shows a tessellation of the RoI;

Figure 7:
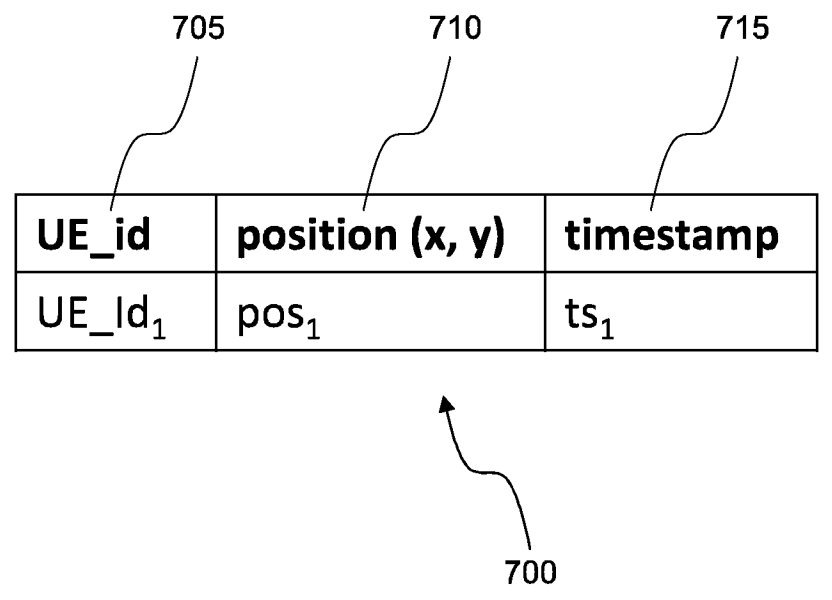

FIG. 7 shows estimates (measurements) sent by User Equipment ("UE" in short) operable in a mobile communication network to the Localization Manager, containing estimates, calculated by the UE, of their geographic positions, together with associated timestamps;

FIG. 8 shows a high-level flowchart of the operations, carried out by the system of FIG. 1, for constructing cells-zones correspondence maps;

FIG. 9 shows a more detailed flowchart of a step of UE configuration of the flowchart of FIG. 8;

FIG. 10 shows a more detailed flowchart of a step of general distribution map construction of the flowchart of FIG. 8;

FIG. 11 shows a more detailed flowchart of a step of cell-specific distribution maps construction of the flowchart of FIG. 8;

FIG. 12 shows a more detailed flowchart of a step of construction of cells-zones correspondence maps of the flowchart of FIG. 8, and FIG. 13 shows a detailed flowchart of the operations carried out by the system of FIG. 1 for calculating the presence of individuals on the RoI and for building the Arrays of Presences.

DETAILED DESCRIPTION OF EXEMPLARY EMBODIMENTS OF THE PRESENT DISCLOSURE

With reference to the drawings, FIG. 1 is a schematic representation of a system 100, according to an exemplary embodiment of an aspect of the present disclosure, for calculating presence of individuals on a geographic territory.

The system 100 is coupled with a mobile communication network 105, such as a (2G, 3G, 4G, 5G or higher/other generation) mobile telephony network deployed on and covering a geographic area (in the following also referred to, shortly, as area or surveyed area or surveyed geographic area) pictorially delimited by and within the dash-and-dot line 107. The area 107 can for example be a city, a municipality, a district, etc.

The system 100 is configured to receive from the mobile communication network 105, for (each or a subset of) UE of individuals located in the surveyed area 107, respective positioning data (i.e., geolocation data). The UE, not shown in the drawings, can be for example mobile phones, smartphones, tablets, with 2G-3G-4G-5G or higher/other connectivity, etc., The mobile communication network 105 comprises a plurality of (two or more) communication stations 105a (e.g., radio base stations of the mobile communication network 105) geographically distributed in the surveyed area 107. Each communication station 105a is adapted to manage communications of UE in one or more served areas or network cells 105b (in the example at issue, three cells are assumed to be served by each communication station 105a).

Each radio base station 105a of the mobile communication network 105 is configured to be adapted to interact with any UE located within one of the cells 105b served by such communication stations 105a (e.g., interactions include interactions at UE power on/off, at location area update, at incoming/outgoing calls, at sending/receiving SMS and/or MMS, at Internet access, etc.). In this document, such interactions between the UE and the mobile communication network 105 are generally referred to as "events" $e_v$ (with v=1, . . . , V; V>0).

The surveyed area 107 may be regarded as subdivided in a plurality of sectors, each one corresponding to a respective cell 105b of the (part of the) mobile communication network 105 superimposed on the surveyed area 107.

The system 100 comprises a Computation Engine 110 configured to be adapted to process data retrieved from the mobile communication network 105. The system 100 comprises a Repository 115 (such as a database, a file system, etc.) configured to be adapted to store data regarding the interactions between the UE and the mobile communication network 105. The Repository 115 can be configured to be adapted to store computation results generated by the Computation Engine 110. The Repository 115 can be configured to be adapted to store any processing data generated by, and/or provided to, the system 100 (generally in a binary format).

The data stored in the Repository 115 include data about the coverage (coverage area data) of the cells 105b of the mobile communication network 105. For the purposes of the present disclosure, the way in which the coverage area data are expressed is not relevant: the coverage area of a cell can indifferently be expressed by way of the geographic coordinates of the center and the radius of a circle defining the cell coverage area or by way of areas delimited by polygons, regular or irregular, with any number of sides, or by way of the union of square pixels, joint or separated. Additionally, the present disclosure does not depend on the way adopted for the computation of the cells' coverage area, so that it is possible to exploit, indifferently, both simplified electromagnetic field propagation models (such as those described in Theodore S. Rappaport, "Wireless Communications", Prentice Hall, 1996, Chapter 3 and Chapter 4, pages 69-196) and mobile network planning tools normally exploited by mobile communication network operators. Moreover, the coverage of the network cells can indifferently be calculated specifically, ad-hoc for the system 100 before the start of the operation of the system 100, or be coverage area data already available to the operator of the mobile communication network 105 for the network planning.

The system 100 is provided with an Administrator Interface (A.I.) 120 (e.g., implemented in a computer) configured and operable for modifying parameters and/or algorithms used by the Computation Engine 110 and/or accessing data stored in the Repository 115.

Figure 2:
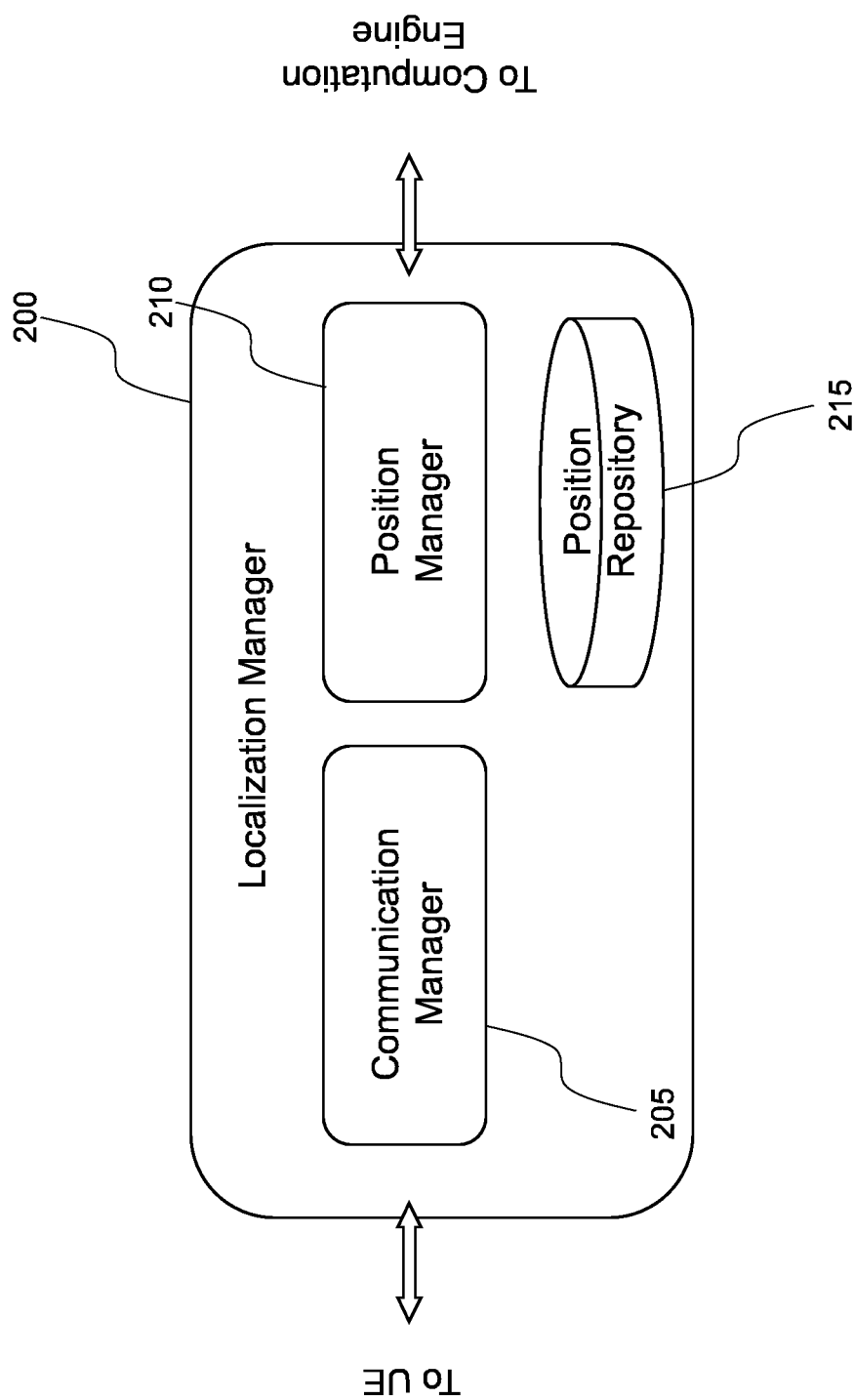

The system 100 may comprise one or more User Interface(s) (U.I.) 125 (e.g., a user terminal, or a software running on a remote terminal connected to the system 100) configured to be adapted to receive inputs from, and to provide output to a user of the system 100. In the present disclosure the expression "user of the system" may refer to one or more human beings and/or to external computing systems (such as a computer network, not shown) of a third party being subscriber of the services provided by the system 100 and enabled to access the system 100—e.g., under subscription of a contract with a service provider owner of the system 100, and possibly with reduced right of access to the system 100, limited compared to the right of access held by an administrator of the system 100 operating through the Administrator Interface 120. The system 100 comprises a Localization Manager 130, shown in greater detail as 200 in FIG. 2, from a logical viewpoint. The Localization Manager 200 comprises a Communication Manager 205 and a Position Manager 210. The Communication Manager 205 is configured to be adapted to manage the communications with the UE (possibly, with a subset of all the UE) that happen to be located in the surveyed area 107, particularly for transferring to the UE configuration parameters of the system (as described in detail later on). The Position Manager 210 is configured to be adapted to receive position estimates, with related timestamps, calculated and sent by the UE, and to transfer the received position estimates and timestamps, when needed, to the Computation Engine 110, for processing by an algorithm for the calculation of presence of individuals on the territory.

The Localization Manager 200 can also include a Position Repository 215 (such as a database, a file system, etc.) in which the position estimates (and related timestamps) provided by the UE are stored. The Position Repository 215 can also be physically integrated in the Repository 115, if suitable (e.g., in case the Localization Manager 200 is physically integrated with the other components of the system 100 or when the transfer of data between the Localization Manager 200 and the Repository 115 can be accomplished quickly without causing delays on the processing operations).

The Localization Manager 200 is configured to be adapted to communicate with the UE through the mobile communication network 105. However, for the purposes of the present disclosure the specific way in which the communication between the Localization Manager 200 and the UE is accomplished, and the protocols adopted therefore, are not limitative. The dialogue between the Localization Manager 200 and the UE can for example take place through the User-plane, e.g., using communication protocols of the Internet world (like the TCP/IP), in a way totally similar to what normally happens between a terminal and a remote server, or through the Control-plane, encapsulating the messages exchanged between the Localization Manager 200 and the UE in signaling messages that apparatuses of the mobile communication network 105 exchange for performing their specific operations.

The system 100 can be implemented in any known manner; for example, the system 100 can comprise a single computer, or a network of distributed computers, either of physical type (e.g., with one or more main machines implementing the Computation Engine 110 and the Repository 115 connected to other machines implementing Administrator and User Interfaces 120 and 125) or of virtual type (e.g., by implementing one or more virtual machines in a network of computers).

Additionally, some modules and/or functionalities of the system 100, such as the Localization Manager 200, can be part of, implemented in, the mobile communication network 105 or possibly be implemented in some apparatuses of the mobile communication network 105 or in the O&M system thereof. The different functionalities of the Localization Manager 200 can be implemented in different apparatuses, depending on the specific necessities of the mobile communication network operator and/or administrator of the system 100 (costs, availability of apparatus, available communication bandwidth for the links, etc.). For the purposes of the present disclosure, these aspects of implementation detail are not strictly relevant.

The system 100 is configured to be adapted to retrieve (and/or receive) from the mobile communication network 105 an event record $er_v$ (v=1, . . . , V; V positive integer) for each event $e_v$ (v=1, . . . , V; I' positive integer) occurred between a generic UE and the mobile communication network 105 (through one of its communication stations 105*a*) within the surveyed area 107. Each event record $er_v$ retrieved by the system 100 from the mobile communication network 105 can comprise—in a non-limitative manner—an identifier of the UE that is involved in the corresponding event $e_v$ (e.g., the UE identifier may be selected as one or more among the International Mobile Equipment Identity-IMEI, the International Mobile Subscriber Identity-IMSI and the Mobile Subscriber ISDN Number-MSISDN code), time data (also denoted as timestamps) indicating the time at which the corresponding event $e_v$ has occurred, and an identifier of the cell 105*b* involved in such event $e_v$.

In one embodiment, the UE identifier of the UE involved in the event record $er_v{}'$ may be provided not in clear, e.g. as an encrypted information in order to ensure the privacy of the UE owner. In other words, if the need arises, the information (i.e., the identity of the owner of the UE corresponding to the UE identifier) may be encrypted/decrypted by implementing a suitable encryption/decryption algorithm, or a cryptographic hash function such as for example the algorithm SHA256 described in "Secure Hash Standard (SHS)", National Institute of Standards and Technology FIPS—180-4, Mar. 6, 2012. In this way, the identity of the individual is not in clear, being replaced by a non-intelligible pseudonym.

The system 100 may retrieve (and/or receive) the event records $er_v$ related to a generic UE from the mobile communication network 105 by acquiring records of data generated and used in the mobile communication network 105. For example, in case the mobile communication network 105 is a GSM network, Charging Data Records (CDRs), also known as call data records, and/or Visitor Location Records (VLRs) may be retrieved from the mobile communication network 105 and reused as event records $er_v$ by the system 100 for its purposes. The CDR is a data record (usually used for billing purposes by a mobile telephony service provider operating through the mobile communication network 105) that contains attributes specific to a single instance of a phone call or other communication transaction performed between a UE and the mobile communication network 105. The VLRs are databases listing UE that have roamed into the jurisdiction of a Mobile Switching Center (MSC, not shown) of the mobile communication network 105, which is a management element of the mobile communication network 105 managing events over a plurality of communication stations 105*a*. Each communication station 105*a* in the mobile communication network 105 is usually associated with a respective VLR.

Conversely, if the mobile communication network 105 is an LTE network, records of data associated with the event records $er_v$ of a generic UE are generated by a Mobility Management Entity (MME), comprised in the mobile communication network 105, which is responsible for a UE tracking and paging procedure in LTE networks (where no VLR is implemented).

It should be noted that the method described in the present disclosure may be implemented by using any source of data (e.g., provided by one or more WiFi networks) from which it is possible to obtain event records $er_v$ comprising a univocal identifier of (mobile terminals of) individuals (such as the UE identifier mentioned above), a location position of such individuals, and a time indication of an instant during which such event has occurred.

In operation, event records $er_v$ may be continuously retrieved by the system 100 from the mobile communication network 105. Alternatively, event records $er_v$ may be collected by the system 100 periodically, e.g. for a predetermined time period (e.g., every certain number of hours, or on a daily or weekly basis). For example, event records $er_v$ may be transferred from the mobile communication network 105 to the system 100 as they are generated, in a sort of "push" modality, or event records $er_v$ may be collected daily in the mobile communication network 105 and then packed and transferred to the system 100 periodically or upon request by the system 100.

The event records $er_v$ retrieved from the mobile communication network 105 are stored in the Repository 115, where they are made available to the Computation Engine 110 for processing. Event records $er_v$ generated by a same UE may be grouped together in the Repository 115, i.e. event records $er_v$ may be grouped together if they comprise a common UE identifier and are in this case denoted as event records group $erg_n$ (e.g., n=0, ..., N, N≥0) hereinafter.

The Computation Engine 110 can be configured to be adapted to execute an algorithm (described in the following) for counting presence of individuals on a geographic area, implemented by a software program product stored in a Memory Element 110a of the system 100, comprised in the Computation Engine 110 in the example of FIG. 1, even though the software program product could be stored in the Repository 115 as well (or in any other memory element, not shown, provided in the system 100).

The event records $er_v$ can be processed according to (as discussed in detail in the following) instructions provided by the system administrator (through the Administrator Interface 120), for example stored in the Repository 115, and, possibly, according to instructions provided by a user of the system 100 (through the User Interface 125).

The Computation Engine 110 may provide the results of the processing performed on the event records $er_v$ to the user of the system 100 through the User Interface 125, and, optionally, the Computation Engine 110 may be configured to store such processing results in the Repository 115.

The system 100 might be adapted to retrieve (or receive) data about individuals not exclusively from a mobile communication network like the mobile communication network 105. Alternatively or in addition, the system 100 may be configured to retrieve (or receive) data about individuals from one or more wireless computer networks, such as WLANs, operating in the surveyed area 107, provided that the UE of the individuals are capable to connect to such wireless computer networks and that the UE (at least a subset of all the UE located in the surveyed area 107) are capable of estimating their position by means of any geo-location technique (such as the GPS).

Figure 3:
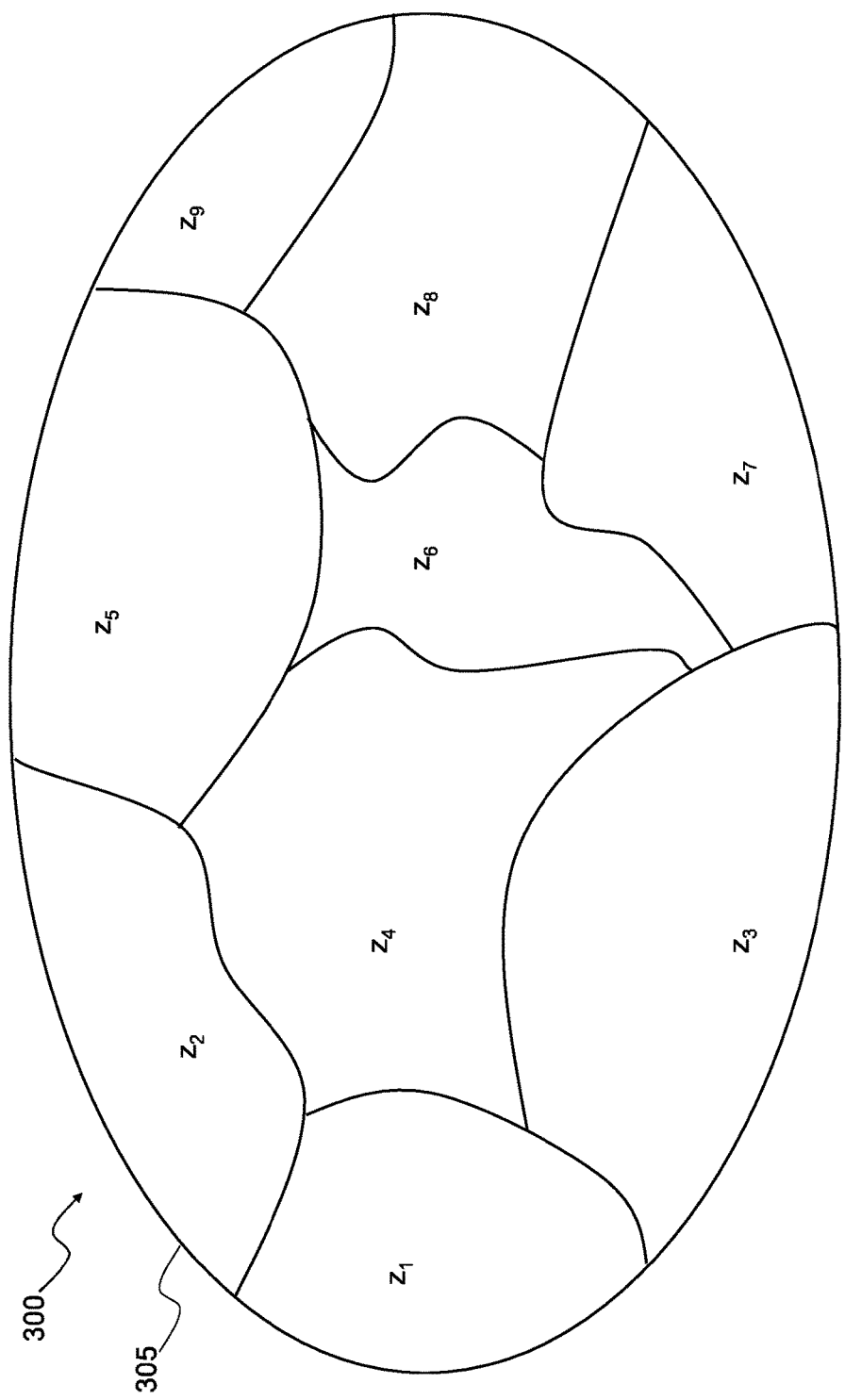

FIG. 3 schematically depicts the surveyed geographic area 107, in the following referred to as Region of Interest (RoI) and identified as 300, as the area within the ellipsis delimited by a boundary, or external cordon 305 (which is assumed to delimit the RoI 300). It is pointed out that the elliptical shape of the RoI 300 is merely exemplary and not limitative: any other shape is possible.

The RoI 300 is a geographic region within which the presence of individuals are to be calculated by the system 100. For example, the RoI 300 may be either a district, a town, a city, or any other kind of geographic area. Moreover, the RoI 300 may comprise a number of sub-regions including non-adjacent geographical locations, such as for example a plurality of different cities, different counties and/or different nations (and so on). In addition, the RoI 300 may comprise a set of one or more predetermined locations (such as for example airports, bus/train stations, etc.).

The RoI 300 is subdivided into a plurality of zones, or simply zones $z_q$ (q=1, ..., Q, where Q is an integer number, and Q>0) in which it is desired to count the presence of individuals. In the example shown in FIG. 3, the RoI 300 is subdivided into nine zones $z_1$, ..., $z_9$ (i.e., Q=9).

Each zone $z_q$ may be determined by using a zoning technique. According to this zoning technique, each zone $z_q$ may be delimited by administrative (city limits, National boundaries, etc.) and/or physical boundaries (such as rivers, railroads etc.) within the RoI 300 that may hinder the traffic flow and may comprise adjacent lots of a same kind (such as open space, residential, agricultural, commercial or industrial lots) which are expected to experience similar traffic flows. The zones $z_q$ may differ from one another in size. Anyway, it is pointed out that the solution according to embodiments of the solution of the present disclosure is independent from the criteria used to partition the RoI 300 into zones $z_q$.

Figure 4:
FIG. 4 shows an Array of Presences generated by the system of FIG. 1, containing indications of the calculated numbers of individuals present in each of the zones of the RoI.

FIG. 4 shows an Array of Presences 400 that is calculated by the system 100 on the RoI 300. The Array of Presences 400 is referred to a respective time interval or time slot ts of an observation time period TP, as described in greater detail in the following. The generic Array of Presences 400 comprises Q rows i and one column. Each row i is associated with a corresponding zone $z_q$ of the RoI 300; thus, considering the RoI 300 in the example of FIG. 3, one of the corresponding Array of Presences 400 comprises nine rows i=1, ..., 9. Each generic element vp(i) of the Array of Presences 400 represents the number of presences in the zone $z_i$ in the corresponding time slot ts.

As outlined above, in order to obtain a more detailed analysis of the presence of individuals, a predetermined observation time period TP of the presence analysis in the region of interest can also established and it can be subdivided into one or more (preferably a plurality) of time slots $ts_m$ (m=1, ..., M, where M is an integer number, and M>0). Each time slot $ts_m$ ranges from an initial instant $t_{0(m)}$ to a next instant $t_{0(m+1)}$ (excluded) which is the initial instant of the next time slot $ts_{m+1}$, or:

$$ts_m = [t_{0(m)}, t_{0(m+1)}).$$

Anyway, in embodiments overlapping time slots can be chosen, as well as one or more time slots can be absent during the predetermined observation time period TP. Also, the time slots $ts_m$ into which the observation time period TP is subdivided may have different lengths (time duration) from one another. Additionally, the observation time period TP may include just one time slot $ts_m$ of length equal to the length of the time period TP.

Figure 5:
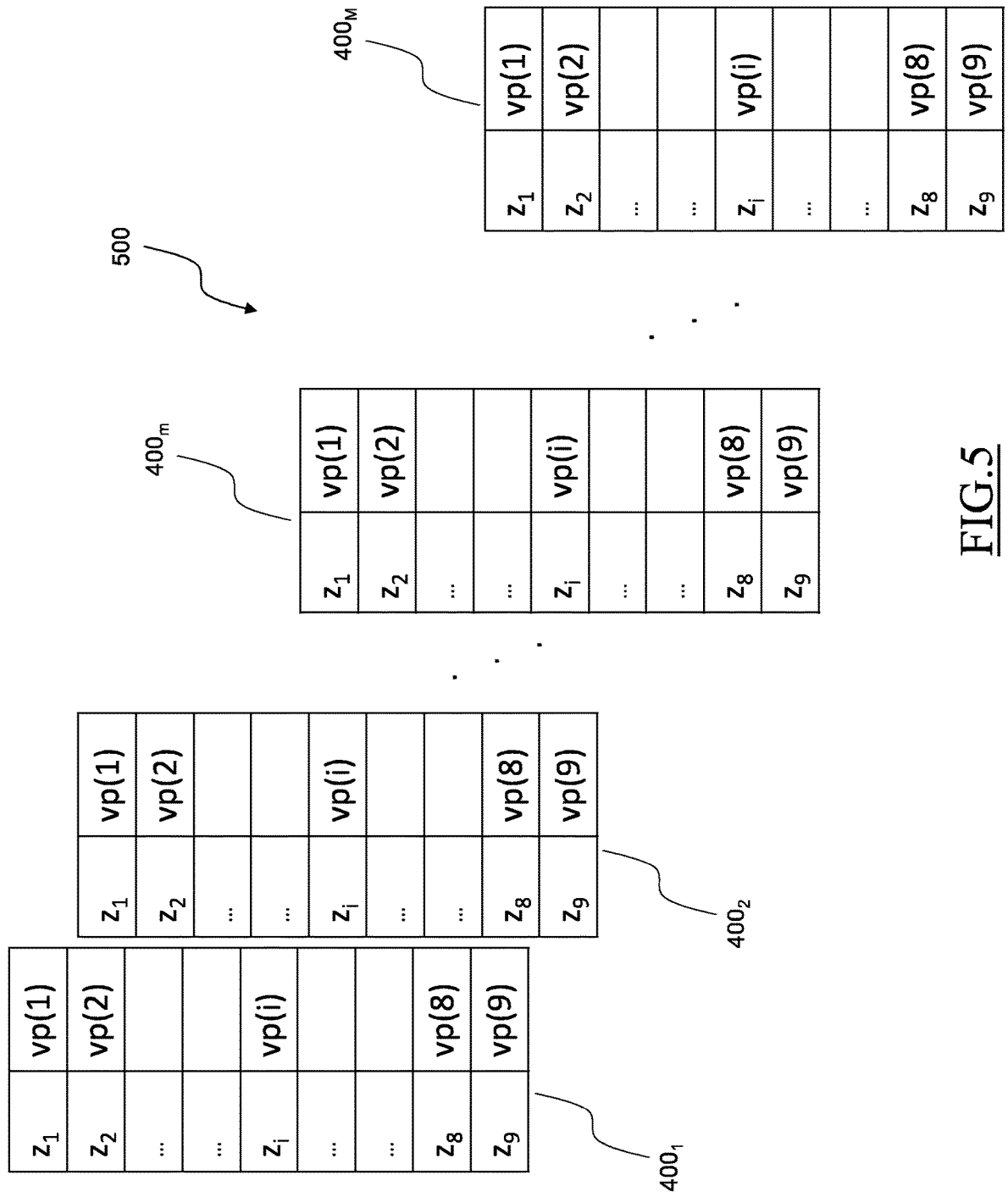
FIG. 5 shows a set of M Arrays of Presences calculated by the system of FIG. 1 in respect of M time slots in which an observation time period is subdivided.

For each one of the time slots $ts_m$ a respective Array of Presences 400m is computed that accounts for the presence of individuals in each zone $z_q$ of the RoI 300 during the time slot $ts_m$. Therefore, a sequence or a set 500 of M Arrays of Presences 400m, as shown in FIG. 5, is obtained that provides information about the presence of individuals in each one of the different zones $z_q$ of the RoI 300 during the observation time period TP.

In one embodiment, commonly used values to which the observation time period TP and the time slots $ts_m$ are set can correspond to 24 hours and 15 minutes, respectively. Naturally, the scope of the present disclosure is not limited by any specific values selected for the observation time period TP and the time slots $ts_m$.

The computation of the presence of individuals on the zones of the RoI 300 and the generation of the set 500 of Arrays of Presences 400$m$ will be now described. The ROI 300 on which the system 100 has to perform the calculation of presence of individuals is completely tessellated by a tessellation 600, as shown in FIG. 6. For the sake of simplicity, a tessellation 600 with square tiles 605 all of equal size has been chosen, but for the purposes of the present disclosure, the shape of the tiles 605 of the tessellation 600 is irrelevant; for example, instead of square tiles, triangular or polygonal tiles can be used. The size of the tiles 605 is also not relevant.

The tessellation 600 of the RoI 300 is independent from the coverage of the RoI 300 by the network cells of the mobile communication network 105: there is no relationship between the tiles 605 and the network cells 105$b$. The tessellation 600 is for example inputted by the administrator of the system 100 through the Administrator Interface 120.

For the purposes of the present disclosure, the system 100 requests to the UE (possibly, to a subset thereof) that happens to be located in the RoI 300 to provide a periodical estimation of their position. The UE may for example exploit the GPS localization resources integrated therein for calculating their position estimates. The position estimates (hereafter also referred to as "position measurements", since the position estimates are obtained by measuring one or more characteristics of radio signals received by the UE from the radio base stations, from GPS satellites or other GNSS, etc., depending on the localization technology adopted) are arranged as t-uples, e.g. triplets 700 of the type (UE_id, position (x,y), timestamp), depicted in FIG. 7, where:

- the field UE_id 705 of the triplet 700 contains an indication of a univocal identifier of the UE that calculated and sent the position estimate. For the purposes of the present disclosure the value to be put in the field UE_id 705 may be selected between one or more among the International Mobile Equipment Identity—IMEI—, the International Mobile Subscriber Identity—IMSI— and the Mobile Subscriber ISDN Number—MSISDN—code;
- the field position (x,y) 710 of the triplet 700 contains an indication of the geographic position (longitude and latitude) estimated by the UE, i.e., the value of the position estimate, expressed in any system of geographic coordinates (e.g., WGS84), and
- the field timestamp 715 of the triplet 700 contains the indication of the time instant at which the position estimate was calculated/determined by the UE.

The field UE_id 705 may also be absent. If present, this field allows optimizing some performances of the system 100, as described later on. In one embodiment of the present disclosure, the value in the field UE_id 705 may be provided not in clear, as encrypted information in order to ensure the privacy of the UE owner. In other words, if the need arises, the information (i.e., the identity of an individual corresponding to the UE whose univocal identifier is specified in the field UE_id 705) may be encrypted/decrypted by implementing a suitable encryption/decryption algorithm, or a cryptographic hash function such as for example the algorithm SHA256 described in "Secure Hash Standard (SHS)", National Institute of Standards and Technology FIPS—180-4, Mar. 6, 2012. In this way, the identity of the individual is not in clear, being replaced by a non-intelligible pseudonym.

The procedure implemented by the system 100 can be regarded as composed by two main phases, generically, but not necessarily, separated in time from each other.

In a first phase of the procedure, cells-zones correspondence maps are constructed. This first phase is based on a set of position estimates (measurements) performed by a set of UE within the RoI 300, exploiting any suitable geolocation technique available at the UE (e.g., the GPS). The time period MP during which such position estimates are carried out is subdivided into time slots, for example the same time slots $ts_m$ used to subdivide the time period TP during which the set 500 of Arrays of Presences 400$m$ is to be calculated on the RoI 300. For each time slot $ts_m$ of the time period MP, a cells-zones correspondence map is calculated: thus, a number M of cells-zones correspondence maps are calculated.

In a second phase of the procedure, for each time slot $ts_m$ of the time period TP the presences on the zones $z_q$ into which the RoI 300 is subdivided are calculated, exploiting the cells-zones correspondence maps calculated in the same time slot $ts_m$ of the time period MP. The set 500 of Arrays of Presences 400$m$ is thus generated.

The term "map" used herein should be not be intended as referring to a common geographic map, rather the term shall be intended as a tool that associates one or more numerical values (obtained by processing data provided by the mobile communication network) to entities representing portions of the territory (like the tiles 605 of the tessellation 600 or the zones zy of the subdivision into zones 300).

Referring to FIG. 8, a procedure 800 according to an embodiment of the present disclosure for constructing cells-zones correspondence maps comprises four main steps:

- step 805: configuration of those UE that will have to provide to the system 100 estimates of their position;
- step 810: construction of general distribution maps (one general distribution map for each time slot $ts_m$);
- step 815: construction of cell-specific distribution maps (one map for each cell, for each time slot $ts_m$), and
- step 820: construction of cells-zones correspondence maps (one map for each time slot $ts_m$).

In greater detail, referring to FIG. 9, in step 805 of the procedure 800 of configuration of the UE (the step 805 is denoted as 900 in FIG. 9), the system 100 selects the UE to be included in a set of UE which will have to calculate and provide to the system 100 position estimates (step 905). Then (step 910), the Localization Manager 200, in particular the Communication Manager 205, sends to the selected UE configuration parameters to be used by the selected UE to perform and provide the position estimates; such configuration parameters may include: an indication of the time interval MP=[$MP_{start}$, $MP_{stop}$] during which the measurement campaign (to calculate the position estimates) will have to be carried out (e.g.: 24 hours from 00:00 to 24:00 of a specific day, etc.), an indication of the periodicity D with which the UE will have to estimate their position (e.g., every 30 seconds) and an indication (flag I/NI) of whether the UE will have to send the position estimates to the Position Manager 210 immediately after the position estimates have been calculated (flag I/NI set to value I) or the calculated position estimates can be sent by the UE at a later time (flag I/NI set to value NI), preferably before the end of the time interval MP of the measurement campaign. If the system 100 has to calculate a set 500 of Arrays of Presences 400$m$ related to a time period TP included in the time period MP and such computation has to be carried out in real time, the system 100 configures the UE to immediately transmit their position estimates, as soon as they are calculated (flag N/I set to I). Differently, in case the system 100 does not need to compute the set 500 of Arrays of Presences 400m in real time, or in case the time period TP is not joined to the time period MP, the system 100 may configure the UE for a non-immediate transmission of their position estimates (flag N/I set to NI); this modality allows the UE to transmit two or more triplets 700 altogether, in a same block, or to exploit the establishment of communication links for other services, in both cases making the transmission more efficient, or a UE happening to be in an uncovered area can wait to return to a covered area and then transmit the position estimates.

The selection of the UE to be inserted in the set of UE which will have to calculate and provide to the system 100 their position estimates and to which the configuration parameters have to be sent, can be accomplished in different ways. One possibility is to send the configuration parameters to all the UE which happen to be within the cells 105b of the mobile communication network 105 inside the RoI 300, for example exploiting a broadcast message. Another possibility is that the administrator of the system 100, possibly in agreement with the operator of the mobile communication network 105, sends the configuration parameters only to a subset of those UE on the basis of one or more criteria, such as for example:

UE of users which have given to the network operator their consent to activate their localization;
UE of users which have given to the network operator or to the administrator of the system 100 their consent to take part to the measurement campaigns to be performed for the specific purposes of the system 100;
UE of users which, at the subscription of the service contract with the network operator, have declared a residence in a given area (e.g., inside the RoI 300 or inside a specific zone of the RoI 300):
UE of users in respect of which the network operator has determined a residence or a working location in a certain area (based on any of the known techniques, e.g. the technique described in U.S. Pat. No. 9,706,363, disclosing a method for identifying and locating at least one relevant location visited by at least one individual within a geographical area served by a wireless telecommunication network the method including: identifying and clustering events that occurred within a predefined distance from each other and having a similar probability, computing a weight value for each cluster of events identified, comparing the weight value with a threshold weight value, if the weight value is equal to, or greater than, the threshold weight value, identifying the relevant location as belonging to a selected typology of relevant location, and providing an indication of the position of the at least one relevant location based on recorded position data of the events of the cluster, or if the weight value is lower than the threshold weight value, identifying the relevant location as not belonging to the selected typology of relevant location).

The selection of the UE which will have to calculate and provide to the system 100 their position estimates is preferably made with the aim of complying with law prescriptions (e.g., concerning privacy of users) and/or to avoid unnecessary processing by the UE or the system 100 (for example, avoiding to include in the set of UE those UE which are expected to just quickly transit through the RoI 300, and which, if selected to take part to the measurement campaign, would send position estimates also when they have moved (far) away from the RoI 300). Additionally, the administrator of the system 100, based on the available hardware/software resources (CPU, RAM, etc.) of the system 100, can decide (e.g., to avoid overloading the system 100, particularly the Localization Manager 200 and the Computation Engine 110) to select, among all the possible UE, a suitably small number of UE. The UE can be selected in a random manner or based on specific requirements for the UE, for example based on the localization features and capabilities of the UE, e.g., in terms of achievable accuracy for the position estimate.

Referring to FIG. 10, the step 810 (denoted as 1000 in FIG. 10) of construction of the general distribution maps (one general distribution map for each time slot $ts_m$) may comprise the following operations.

For each general distribution map to be constructed and for each tile 605 of the tessellation 600 in respect of each general distribution map, a counter n_pos is initialized to an initial value, e.g. to 0 (zero); the counter n_pos will be used to count the number of position estimates received by the selected UE falling in said tile in the considered time slot $ts_m$ (step 1005).

Then, starting from the time instant $MP_{start}$ and till the time instant $MP_{stop}$ of the time period MP during which the measurement campaign is carried out, the UE selected at step 905 estimate their own geographic position every I) seconds and send the calculated position estimates (in accordance to the timing specified by the setting of the flag I/NI) to the Position Manager 210, e.g. in the form of triplets 700 as depicted in FIG. 7; the Position Manager 210 stores the received triplets 700 in the Position Repository 215 (step 1010).

For each time slot $ts_m$, at the end of the same, or, alternatively, at the end of the time period MP, the Position Manager 210 extracts from the Position Repository 215 all the received triplets 700 having a value in the respective field timestamp 715 included in the time slot $ts_m$ under consideration and sends the extracted triplets to the Computation Engine 110 (step 1015). In case the time period TP is included in the time period MP and the system 100 has to process the data and create the set 500 of Arrays of Presences 400m in real time, the operation 1015 should start as soon as the timeslot $ts_m$ ends; otherwise the operation can be started after the end of the time period MP.

The Computation Engine 110 receives from the Position Manager 210 the extracted triplets 700 and, for each received triplet, based on the geographic coordinates included in the field position (x,y) 710 thereof, it determines in which tile 605 of the tessellation 600 the considered triplet falls (step 1020). The Computation Engine 110 increases of a predetermined amount (e.g., 1) the counter n_pos corresponding to the determined tile 605 (step 1025). In the case that the geographic coordinates present in the field position (x,y) 710 of a triplet 700 under consideration are internal to the determined tile 605 there is a univocal assignment of the position of the corresponding UE to that tile (and the counter n_pos of that tile is increased); when instead the coordinates present in the field position (x,y) 710 of the triplet 700 are located on the boundary between two or more tiles 605 of the tessellation 600, there are two possibilities: 1) a first possibility is to randomly select one of the two or more concerned tiles and to increase of the predetermined amount (e.g., 1) the counter n_pos corresponding to the randomly selected tile 605; 2) another possibility is to increase the counters n_pos associated to all the two or more concerned tiles 605 of the predetermined amount (e.g., 1) divided by the number of concerned tiles 605. The choice between one or the other of these two possibilities can for example be made by the administrator of the system 100, through the Administrator Interface 120.

Once all the triplets 700 relating to the time slot $ts_m$ have been analysed by the Computation Engine 110, the general distribution map is obtained that, for the considered time slot $ts_m$, associates, with each tile 605 of the tessellation 600, a value of the respective counter n_pos equal to the number of position estimates which have been received from the (selected) UE and which have geographic coordinates in the field position (x,y) 710 falling in said tile 605.

Then, the step 815 of construction of the cell-specific distribution maps for each time slot $ts_m$ starts. This step is schematically depicted in the flowchart of FIG. 11 where it is denoted 1100.

For each network cell $c_l$ of the mobile communication network 105 the Computation Engine 110 extracts from the Repository 115 the corresponding coverage area (step 1105) and determines all the K tiles 605 of the tessellation 600 that belong to the coverage area of the cell $c_l$ (step 1110). One way to determine that a tile 605 belongs to the coverage area of the cell $c_l$ is by assessing that the coordinates of the center of gravity of the tile 605 fall inside the coverage area of the cell $c_l$, or that a given percentage (fraction) of the tile surface, for example a predetermined % value, falls inside the coverage area of the cell $c_l$. The choice of the specific criterion/criteria for considering that a tile 605 belongs to the coverage area of the cell $c_l$ is for example made by the administrator of the system 100 through the Administrator Interface 120.

For each one of the K tiles determined at step 1110, the Computation Engine 110 calculates a weight value weight % as the ratio between the numerical value of the counter n_pos for that tile 605 and the sum of the numerical values of the counters n_pos for all the K tiles:

$$\text{weight } \%_{l,i} = \text{n\_pos}_{l,i} / \sum_{j=1}^{K} \text{n\_pos}_j \quad \text{(Equation 1)}$$

with the index i=1, ..., K (step 1115). The result of this operation is, for each time slot $ts_m$, the cell-specific distribution map for the cell $c_l$, which establishes a correspondence between each tile 605 of the tessellation 600 and a weight value calculated as in Equation 1. Such a weight value can be regarded as the probability that a user of a UE that is located in the coverage area of the cell $c_l$ is, in the generic time slot $ts_m$, specifically located in the i-th tile 605 of the tessellation 600. By repeating these operations for all the cells of the mobile communication network 105 a set of cell-specific distribution maps is obtained for every time slot $ts_m$, one for every cell.

When the time period MP lasts 24 hours or, more generally, a few days (the duration of the time period MP may depend on how often the mobile communication network operator modifies the coverage of the network) the system 100 can be configured by the system administrator in such a way that the operations 1105 and 1110 are performed only once, at the time the triplets 700 of the first time slot ts of the time period MP are processed. The tiles 605 identified at that time are used, without changes, also during the processing performed for the other time slots from $ts_2$ to $ts_M$.

At this point, the step 820 of constructions of cells-zones correspondence maps (one for each time slot $ts_m$) commences, as schematized by the procedure 1200 in the flowchart of FIG. 12.

For each zone $z_q$ of the subdivision in zones of the RoI 300 the K' tiles 605 of the tessellation 600 that belong to the considered zone $z_q$ are identified (step 1205). One way to determine that a tile 605 belongs to the zone $z_q$ is by assessing that the coordinates of the center of gravity of the tile 605 fall inside the zone $z_q$, or that a given percentage (fraction) of the tile surface, for example a predetermined % value, falls inside the zone $z_q$. The choice of the specific criterion/criteria for considering that a tile 605 belongs to the zone $z_q$ is for example made by the administrator of the system 100 through the Administrator Interface 120. For simplifying the configuration and the management of the system 100, the specific criteria adopted (coordinates of the center of gravity of the tile 605 inside the zone $z_q$, a given percentage of the tile 605 inside the zone $z_q$ or any other possible criterion) for identifying such K' tiles may be the same adopted in step 1110 for identifying the K tiles belonging to the coverage area of each cell of the mobile communication network 105.

In addition, step 1205, similarly to step 1110, can be performed just once, at the time of processing of the position estimates of the first time slot $ts_1$ of the time period MP.

Then, for each time slot $ts_m$ and for each cell $c_l$ of the mobile communication network 105, by exploiting the cell-specific distribution map for that cell, calculated in the preceding step 815 and referring to the time slot $ts_m$ (steps 1105-1115), the weight $(P_{l \to q})_m$ of the cell $c_l$ on the zone $z_q$ is calculated by summing up the weights of the K' tiles identified at step 1205 and obtained from the map (step 1210), i.e.:

$$(P_{l \to q})_m = \sum_{i=1}^{K'} (\text{weight } \%_{l,i})_m. \quad \text{(Equation 2)}$$

Such weight $(P_{l \to q})_m$ can be regarded as the probability that a user of a UE that is located in the coverage area of the cell $c_l$ is, in the time slot $ts_m$, located in the specific zone $z_q$ among all the zones of the partition in zones of the RoI 300.

By repeating this operation in every time slot $ts_m$ and for all the cells $c_l$ of the mobile communication network 105, the cells-zones correspondence map is obtained, which is the map in which every zone $z_q$ of the subdivision in zones of the RoI 300 is associated with the total weight of each cell $c_l$ of the mobile communication network 105 on such a zone in the time slot $ts_m$.

The cells-zones correspondence maps, relating to the time slot $ts_m$ of the time period MP, are exploited for calculating, in the corresponding time slot $ts_m$ of the time period TP, the presences on the zones $z_q$ in which the RoI 300 is subdivided, and thus the set 500 of Arrays of Presences 400m. The operations are schematized as 1300 in the flowchart of FIG. 13 and are described herebelow.

At the end of every time slot $ts_m$, all the event records $er_v$ having a timestamp falling in that time slot are extracted from the Repository 115 (step 1305).

For each event record $er_v$, the cell $c_l$ in which the event occurred is identified (step 1310) and, exploiting the cells-zones correspondence map for that cell, the K" zones $z_q$ in which that cell has a weight $(P_{l \to q})_m$ different from zero are determined (more generally, the cell has a weight greater than a predetermined cell weight value and this predetermined cell weight value is is preferably set by the administrator of the system 100 through the Administrator Interface 120) (step 1315). The value in the field of the Array of Presences 400m corresponding to the determined zones is increased of an amount equal to $(P_{l \to q})_m$. By repeating steps 1310 to 1320 for all the event records $er_v$ extracted from the Repository 115 at step 1305, the final Array of Presences 400m is obtained, i.e. the array containing the number of presences of individuals in each zone of the RoI 300 in the time slot $ts_m$.

The Array of Presences 400m is provided in output by the system 100, to the user of the system 100, through the User Interface 125.

By repeating the operations in the flowchart 1300 for all the M time slots of the time period TP, the complete set 500 of Arrays of Presences 400m is obtained.

After having provided the set 500 of Arrays of Presence 400m, the operation of the system 100 ends.

In other embodiments, the method may include different steps, or some steps may be performed in a different order or in parallel.

In case, during operation 1305, it comes out that in the time slot $ts_m$ there are more than one event records $er_v$ related to a same UE, before performing operation 1310 it may be preferable to select just one event record $er_v$, to avoid that a same UE, and thus a same user, is counted twice or more within a same time slot $ts_m$; for example, it is possible to select the first event record $er_v$, or the last event record $er_v$ related to that UE, or an event record $er_v$ among the two or more event records related to that UE is selected randomly among the event records related to that UE. The selection criterion may be set by the administrator of the system 100, through the Administration Interface 120. Instead, in the case that during the time slot $ts_m$ a UE does not have any related event record $er_v$, even if in at least one preceding time slot that UE had at least one event record $er_v$, the Computation Engine 110, before performing operation 1310, may decide to exploit, for that UE, the last, more recent event record $er_v$ available for the preceding time slots (in order to take into account, in the count of presence of individuals, also users that in a certain time slot did not perform any activity but can be reasonably assumed to still be in the previous position). Also this operation is decided by the administrator of the system 100 through the Administrator Interface 120.

If the Array of Presences 400m, upon request of the user of the system 100 through the User Interface 125, has to be generated in real-time, the operations globally denoted as 1300 have to be carried out as soon as the time slot $ts_m$ ends, so as to ensure that all the event records $er_v$ with timestamp within that time slot are taken into consideration. When instead the system 100 is not requested to generate the Array of Presences 400m in real-time, the operations 1300 can be carried out at any time, for example even at the end of the time period TP. The timing for carrying out the operations can be decided by the administrator of the system 100 through the Administration Interface 120.

If the system 100 is exploited for calculating the presence of individuals in two or more RoIs 300 at a time, during operation at step 1015 the Position Manager 210 can look and take into consideration, in addition to the field timestamp 715 of the triplet 700 containing the position estimate, also the identifier, contained in the field UE_id 705 of the triplet, of the UE that calculated the position estimate (if the field UE_id 705 is present) and retrieve from the Position Repository 215 only the position estimates coming from those UE that, with the operation at step 905, have been identified to be in a certain one of the RoIs 300.

If, while performing the operations at step 1015 for the time slot $ts_m$ under analysis, it is determined that no useful triplets 700 are stored in the Position Repository 215, or the available triplets 700 are in a number less than a minimum threshold number, the Position Manager 210 may extract from the Position Repository 215 also the triplets 700 included in the immediately adjacent (preceding and successive) time slots, until the overall number of extracted position estimates reaches the threshold number. All these triplets are then sent to the Computation Engine 110 for being processed, as if such triplets 700 were all internal to the time slot $ts_m$ under consideration. This option and the minimum threshold number can be decided and configured by the administrator of the system 100 through the Administration Interface 120.

In order to reduce the processing time of the system 100 or to reduce the need of communication bandwidth for the communication between the Position Manager 210 and the Computation Engine 110 when the two modules are physically separated from each other, the administrator of the system 100 can decide to reduce the number of, e.g. to decimate, the position estimates 700 to be processed by the Position Manager 210 before the transmission to the Computation Engine 110 (operation at step 1015), or to be processed by the Computation Engine 110 before starting the processing (operations at step 1020). In this way, just one triplet 700 (i.e., just one position estimate) is taken out of a number n of triplets 700 (i.e., n position estimates). Such a reduction in number of the position estimates to be subject to processing can be operated on a per-user (per-UE) basis, in case the field UE_id 705 is present in the triplets 700 (this means that one measurement is retained for each value of the field UE_id), or globally on all the position estimates (this means that one measurement is retained every n measurements, irrespective of the UE-identified by the value in the field UE_id—that performed the measurements).

For similar reasons, the Position Manager 210 or the Computation Engine 110 can be configured by the administrator of the system 100 (through the Administrator Interface 120) to calculate, from the set of position estimates extracted during the operations at step 1015, an average position for each UE, if the field UE_id 705 is present, and to exploit this single average position in the operations at step 1020. Also this option can be decided by the administrator of the system 100.

The set of measurements (position estimates) performed during a measurement campaign MP can be exploited without changes for calculating the set 500 of Arrays of Presences 400m related to more than one observation time periods TP. In other words, when a user of the system 100 requests to the system 100 the calculation of the set 500 of Arrays of Presences 400m on a certain time period TP, before starting a measurement campaign on a certain time period MP, the user may ascertain if in the system 100, particularly in the Position Repository 215, there are already stored triplets 700 obtained in a preceding time period MP on the RoI 300 of interest for the user, and decide to exploit the already available triplets 700 on the subdivision in zones of the RoI of that user. In this case, the system 100 starts directly with the operations at step 1015. Even more, if the tessellation and/or the subdivision in zones of the RoI of interest for that user of the system 100 are the same to that/those used previously, the user of the system 100 may decide to reuse the general distribution maps and the cells-zones correspondence maps already calculated previously. The processing burden for calculating the new set 500 of Arrays of Presences 400m is consequently reduced.

The solution according to the present disclosure is independent from the specific localization technique employed by the UE for estimating their positions: it is for example possible to employ a technique based on mobile radio technology, standard or not (Cell-Id, TOA, based on radio signal strength measurements, etc.), or a technique based on short-range communication capabilities of the UE (e.g., Wi-Fi, Bluetooth, etc.) or a satellite-localization technique (GPS, Galileo, etc.).

In an embodiment of the present disclosure, the UE can send, within the triplets 700, particularly within the field position (x,y) 710 of the triplets 700, also an indication of the uncertainty, or of the accuracy, associated with the estimated position. The Computation Engine 110, when performing the operations at step 1020, can decide to use only those position estimates that are accompanied by a value of uncertainty lower than a predefined uncertainty threshold, for example set by the administrator of the system 100 through the Administrator Interface 120. The uncertainty threshold can depend on the characteristic size of the generic tile 605 of the tessellation 600 (for example, in case of square tiles 605, the uncertainty threshold can be set equal to half the length of the tile side; for circular tiles, the uncertainty threshold can be set equal to the radius of the circumference delimiting the tile).

In an embodiment of the present disclosure, the operations at step 810 can be cooperatively carried out also with the participation of those UE that are not capable of estimating their position (either because they do not have installed a suitable software or because the software available to them always provided results affected by an a-priori unacceptable uncertainty). These can be UE that are only capable of measuring the characteristics of the radio signal received from the radio base stations 105*a* (e.g., serving radio base station, received radio signal power, adjacent radio base stations, etc.). The Position Manager 210, upon receiving these measurements, can calculate the position of the UE exploiting a localization algorithm and store the results in the Position Repository 215 (step 1010).

The system 100 can be implemented by means of an app/server architecture, which provides for having an app installed on the UE which dialogues with a remote server using, at high level, Internet protocols and, at a lower level, the User-plane of the mobile communication network 105. Alternatively, the solution according to the present disclosure can be actuated exploiting, at least in part, messages and functions of the MDT (Minimization of Drive Tests) technology, introduced in the Release 10 of the 3GPP standard for UMTS and LTE (see e.g. the 3GPP TS 37.320). For example, in case of immediate transmission (flag I/NI set to I) of the position estimates, it is possible to exploit the functionality called "Immediate MDT", whereas in case of delayed transmission (flag I/NI set to NI) it is possible to exploit the functionality called "Logged MDT".

The invention claimed is:

1. A method, implemented by a data processing system, for estimating presence of individuals on a territory based on data derived from a mobile communication network comprising a plurality of network cells covering said territory, wherein said individuals are users of mobile communication terminals interact with the mobile communication network and located in said territory, the method comprising:
subdividing a geographic area of interest in geographic zones;
subdividing the geographic area of interest in geographic area portions;
causing mobile communication terminals served by the mobile communication network and situated in the geographic area of interest to calculate respective geographic position estimates and provide the calculated geographic position estimates to the data processing system;
distributing an overall number of geographic position estimates, received from the mobile communication terminals, on the geographic area portions by assigning to each geographic area portion a respective number of geographic position estimates corresponding to geographic positions estimates falling within said geographic area portion;
for each of said at least one network cell:
determining, among said geographic area portions, covered geographic area portions falling within a coverage area of said network cell;
assigning to each one of the determined covered geographic area portions a respective weight which depends on said respective number of geographic position estimates compared to an overall number of geographic position estimates falling within all said determined covered geographic area portions; and
generating a correspondence map establishing a correspondence between said network cells and said geographic zones, said generating the correspondence map comprising, for each of said network cells, calculating a cell weight of the network cell on each geographic zone by determining the geographic area portions belonging to each of said zones and summing the respective weights of the geographic area portions identified as belonging to said each of said zones;
receiving from the mobile communication network and storing in a repository indications of events of interaction between the mobile communication terminals and the network cells of the mobile communication network;
identifying, for each one of the stored indications of events of interaction, the network cell in which the event of interaction occurred;
using the correspondence map, building an array of presences in which each of said geographic zones has assigned thereto a respective indication of a respective number of events of interaction occurred in the identified network cells which have, in said each of said geographic zones, a cell weight greater than a predetermined cell weight value; and
providing said array of presences in output to said data processing system for the use, by a user of the data processing system, for estimating presence of individuals on a territory.

2. The method of claim 1, wherein said events of interaction comprise at least one among:
interactions at the power-on and/or power-off of the mobile communication terminals;
interactions at location area update procedures;
interactions at the re-entrance of the mobile communication terminals into a covered area, covered by the mobile communication network, from an area not covered by the network;
interactions at the switch of the mobile communication terminals from a mobile network technology to another;
interactions at incoming/outgoing calls;
interactions at sending/receiving SMS and/or MMS; and
interactions at Internet access.

3. The method of claim 1, wherein said building an array of presences comprises building a set of arrays of presences, each array of presences of said set being related to a respective time slot of a plurality of time slots in which an observation time period is subdivided.

4. The method of claim 1, wherein said causing mobile communication terminals served by the mobile communication network and situated in the geographic area of interest to calculate respective geographic position estimates and provide the calculated geographic position estimates to the data processing system comprises selecting, among all the mobile communication terminals served by the mobile communication network and situated in the geographic area of interest, a subset of selected mobile communication terminals according to a selection criterion comprising at least one among:

mobile communication terminals of users giving consent for activating their geographic localization;

mobile communication terminals of users giving consent for measurement campaigns calculating the presence of individuals on a geographic territory;

mobile communication terminals of users which, at subscription, have declared a residence in a certain area inside the geographic area of interest; and mobile communication terminals of users in respect of which the operator of the mobile communication network has determined a residence or a working location in a certain area inside the geographic area of interest.

5. The method of claim 4, comprising configuring the subset of selected mobile communication terminals, said configuring comprising providing to the selected mobile communication terminals at least one among:

indicating a time interval during which the selected mobile communication terminals calculate the respective geographic position estimates;

indicating a periodicity with which the selected mobile communication terminals calculate the respective geographic position estimates; and indicating whether the selected mobile communication terminals providing to the data processing system the respective calculated geographic position estimates immediately after calculating the respective geographic position estimates or providing to the data processing system after calculating the respective geographic position estimates.

6. The method of claim 1, wherein determining covered geographic area portions falling within a coverage area of that network cell comprises:

obtaining a coverage area of that network cell; and determining which of said geographic area portions belong to the coverage area of the network cell, wherein said determining comprises at least one among:

assessing which of said geographic area portions have geographic coordinates of a center of gravity thereof falling inside the coverage area of the network cell; and assessing which of said geographic area portions fall, for a given percentage of their area, inside the coverage area of the network cell.

7. The method of claim 1, wherein said determining the geographic area portions belonging to each of said zones comprises one among:

assessing which of said geographic area portions have geographic coordinates of a center of gravity thereof falling inside the zone; and assessing which of said geographic area portions fall, for a given percentage of their area, inside the zone.

8. The method of claim 1, wherein said assigning to each geographic area portion a respective number of geographic position estimates corresponding to geographic positions estimates falling within said geographic area portion comprises, in case a geographic position estimate falls on a boundary between at least two geographic area portions either:

randomly selecting and assigning one of the at least two geographic area portions to that geographic position estimate, or assigning to each of said at least two geographic area portions a fraction of said geographic position estimate equal to 1 divided by the number of said at least two geographic area portions.

9. The method of claim 1, wherein said calculated geographic position estimates are provided in the form of t-uples, wherein each t-uple comprises: a field containing an indication of the geographic position estimated by the mobile communication terminal, expressed in any system of geographic coordinates, a field containing an indication of the time instant at which the geographic position estimate has been calculated, and a field containing an indication of a univocal identifier of the mobile communication terminal that calculated and sent the geographic position estimate.

10. A data processing system comprising modules configured to perform, when operated, the method of claim 1.

* * * * *